(12) United States Patent
Fujiwara et al.

(10) Patent No.: US 6,914,601 B2
(45) Date of Patent: Jul. 5, 2005

(54) METHOD, APPARATUS, AND COMPUTER PROGRAM FOR GENERATING THREE-DIMENSIONAL SHAPE DATA OR VOLUME DATA

(75) Inventors: Koichi Fujiwara, Otsu (JP); Koji Fujiwara, Osaka (JP)

(73) Assignee: Minolta Co., Ltd., Osaka (JP)

( * ) Notice: Subject to any disclaimer, the term of this patent is extended or adjusted under 35 U.S.C. 154(b) by 418 days.

(21) Appl. No.: 10/166,261

(22) Filed: Jun. 11, 2002

(65) Prior Publication Data

US 2002/0190986 A1 Dec. 19, 2002

(30) Foreign Application Priority Data

Jun. 12, 2001 (JP) .......................................... 2001-177582
Jun. 12, 2001 (JP) .......................................... 2001-177583

(51) Int. Cl.[7] .............................................. G06T 17/00
(52) U.S. Cl. ........................................................... 345/424
(58) Field of Search ............................................ 345/424

(56) References Cited

U.S. PATENT DOCUMENTS

| | | | | |
|---|---|---|---|---|
| 4,710,876 A | * | 12/1987 | Cline et al. ................. | 345/423 |
| 4,719,585 A | * | 1/1988 | Cline et al. ................. | 345/424 |
| 4,982,438 A | * | 1/1991 | Usami et al. ............... | 382/154 |
| 6,317,139 B1 | * | 11/2001 | Williams .................... | 345/634 |
| 2004/0096096 A1 | * | 5/2004 | Huber ........................ | 382/152 |

FOREIGN PATENT DOCUMENTS

| | | |
|---|---|---|
| JP | 6-259570 | 9/1994 |

OTHER PUBLICATIONS

Merging Range Images of Arbitrarily Shaped Objects. Rutishauser et al. Computer Vision and Pattern Recognition. 1994. p. 573–580.*

A General Surface Approach to the Integration of a Set of Range Views. Soucy et al. IEEE Transactions on Pattern Analysis and Machine Intelligence. vol. 17, No. 4. Apr. 1995. p. 344–358.*

Generating Octree Models of 3D Objects from Their Silhouettes in a Sequence of Images. Potmesil, Michael. Computer Vision, Graphics and Image Processing 40. 1987. p. 1–29.*

Marching Cubes: A High Resolution 3D Surface Construction Algorithm. William E. Lorensen and Harvey E. Cline. Computer Graphics, vol. 21, No. 4. Jul. 1987.*

Y. Matsumoto, et al *"Three–dimensional Modeling System"* Sanyo Technical Review, vol. 31, No. 1, May 1999.

B. Curless, et al *"A Volumetric Method for Building Complex Models form Range Images"* Computer Graphics Proceedings, Annual Conference Series, Aug. 4–9, 1996.

* cited by examiner

*Primary Examiner*—Mark Zimmerman
*Assistant Examiner*—Peter-Anthony Pappas
(74) *Attorney, Agent, or Firm*—McDermott Will & Emery LLP

(57) ABSTRACT

Disclosed herein are a method for generating volume data from images of an object viewed from diverse view points. This method comprises the steps of: (a) in each of discrete coordinate positions within a coordinate system for rendering a volume, obtaining a value corresponding to the distance to the boundary of a viewed volume defined by the contour of the image of said object and by the point of view of said image; and (b) in each of said coordinate positions, on the basis of a plurality of said values obtained for said images of said object, determining a value corresponding to the distance to the object surface and then maintaining said value in a manner corresponded to said coordinate position. In the method, multi-valued data can be assigned to each vertex or lattice point, and therefore, a small number of voxels can represent precisely the three-dimensional shape.

7 Claims, 20 Drawing Sheets

TLs (TLr)

| Coordinate of Vertex | Attribute |
|---|---|
| 0, 0, 0 | $-\infty$ |
| 0, 0, 1 | $-\infty$ |
| ⋮ | ⋮ |
| 1, 0, 0 | $+3.2$ |
| 1, 0, 1 | $+3.7$ |
| ⋮ | ⋮ |
| 1, 2, 6 | $-2.3$ |
| 1, 2, 7 | $-2.8$ |
| ⋮ | ⋮ |
| 34, 62, 27 | $+\infty$ |
| 34, 62, 28 | $+\infty$ |
| ⋮ | ⋮ |
| 100, 100, 100 | $-\infty$ |

| Range<br>Silhouette | Insie (far) | Insie (near) | Outsie (near) | Outsie (near) |
|---|---|---|---|---|
| Insie (far) | $-\infty$ | $-\infty$ | $-\infty$ | $-\infty$ |
| Insie (near) | d s | M i x | M i x | d s |
| Outsie (near) | d s | M i x | M i x | d s |
| Outsie (far) | $+\infty$ | d r | d r | $-\infty$ |

METHOD, APPARATUS, AND COMPUTER PROGRAM FOR GENERATING THREE-DIMENSIONAL SHAPE DATA OR VOLUME DATA

CROSS-REFERENCE TO RELATED APPLICATIONS

This application is based on Japanese Patent Application Nos. 2001-177582 and 2001-177583 both filed in Japan on Jun. 12, 2001, the entire content of which is hereby incorporated by reference.

BACKGROUND OF THE INVENTION

1. Field of the Invention

The present invention relates to a method, an apparatus, and a computer program for generating three-dimensional shape data or volume data.

2. Related Art of the Invention

A method named "shape from silhouette" has been known as a prior art method for generating three-dimensional shape data for an object.

In the shape-from-silhouette method, a plurality of images of an object are obtained by photographing (or imaging) from diverse points of view, whereby the three-dimensional shape of the object is reproduced. That is, in the shape-from-silhouette method, on the basis of each image of the object photographed in a direction of sight, the region of presence of the object which reflects the shape viewed in the direction of sight is described as a set of voxels in the three-dimensional image space. Then, a set composed of voxels each belonging to all of the above-mentioned sets of voxels describing the images viewed in the diverse directions of sight is obtained as the object in the three-dimensional image space.

Nevertheless, in the prior art shape-from-silhouette method, the shape of the object is represented only by the presence or absence of each voxel. That is, the attribute of each voxel is two-valued such as to indicate whether the voxel is included inside the object or not.

Accordingly, the resolution of the voxels directly provides the resolution on the object surface. Thus, in order to obtain a more precise three-dimensional representation of the object, voxels of higher resolution are necessary. This needs a huge number of voxels, and hence causes the problem of a significant increase in the memory capacity necessary for storing the volume data.

In addition to this problem, in the shape-from-silhouette method, depressed or concave portions of the object are not expressed in the silhouette images. Accordingly, there is the problem that such recesses can not be reproduced.

Another prior art method for reproducing the three-dimensional shape of an object uses a range sensor (three-dimensional measuring instrument) for measuring the object by a non-contact method such as light-section method. Nevertheless, in such a method using the range sensor, there is the problem that data is not obtained for the object surface having very low surface reflectivity, whereby the three-dimensional shape of such surface portions is not reproduced.

SUMMARY OF THE INVENTION

With considering the above-mentioned problems, an object of the invention is to represent precisely the three-dimensional shape of an object, using a small amount of memory capacity.

In order to achieve the object, a first aspect of the invention is a method for generating volume data from a plurality of images of an object viewed from diverse points of view, said method comprising: (a) in each of discrete coordinate positions within a coordinate system for rendering a volume, a first step of obtaining a value corresponding to the distance to the boundary of a viewed volume defined by the contour of the image of said object and by the point of view of said image; and (b) in each of said coordinate positions, on the basis of a plurality of said values obtained for said images of said object, a second step of determining a value corresponding to the distance to the object surface and then maintaining said value in a manner corresponded to said coordinate position.

Inverse transformation of the generated volume data reproduces the three-dimensional shape of the object.

In the method according to the first aspect, multi-valued data can be assigned to each vertex or lattice point. By virtue of this, a small number of voxels can represent precisely the three-dimensional shape. Thus, according to the invention, a small amount of memory capacity can represent precisely the three-dimensional shape of an object.

With considering the above-mentioned problems, an object of the invention is to reproduce three-dimensional shape precisely, using a small amount of memory capacity and a small amount of operation time as much as possible even in case of an object having recesses and low reflectivity portions.

In order to achieve the object, a second aspect of the invention is a method for generating the three-dimensional shape data of an object, said method comprising: a first step of transforming a plurality of images of said object viewed from diverse points of view into volume data by shape-from-silhouette method, and thereby generating first volume data; a second step of transforming three-dimensional data obtained by three-dimensional measurement of said object into volume data, and thereby generating second volume data; and a third step of integrating said first volume data and said second volume data into integrated volume data.

The first step of transforming the data into volume data by shape-from-silhouette method preferably comprises: (a) in each of discrete coordinate positions within a coordinate system for rendering a volume, the step of obtaining a value corresponding to the distance to the boundary of a viewed volume defined by the contour of the image of said object and by the point of view of said image; and (b) in each of said coordinate positions, on the basis of a plurality of said values obtained for said images of said object, the step of determining a value corresponding to the distance to the object surface and then maintaining said value in a manner corresponded to said coordinate position.

The second step of transforming the three-dimensional data into volume data preferably comprises: (a) in each of discrete coordinate positions within a coordinate system for rendering a volume, the step of obtaining a value corresponding to the distance to the object surface represented by said three-dimensional data of said object; and (b) the step of maintaining said value in a manner corresponded to said coordinate position.

Inverse transformation of the generated volume data reproduces the three-dimensional shape of the object.

In the method according to the second aspect, disadvantages in the diverse methods for generating three-dimensional shape data are compensated with each other, whereby a precise three-dimensional model without deficit is obtained. Thus, in the method according to the second aspect, three-dimensional shape is precisely reproduced using a small amount of memory capacity and a small amount of operation time as much as possible even in case of an object having recesses and low reflectivity portions.

BRIEF DESCRIPTION OF THE DRAWINGS

These and other objects, advantages and features of the invention will become apparent from the following description thereof taken in conjunction with the accompanying drawings in which.

DESCRIPTION OF THE PREFERRED EMBODIMENTS

Embodiments of the invention are described below with referring to the accompanying figures.

Figure 1:
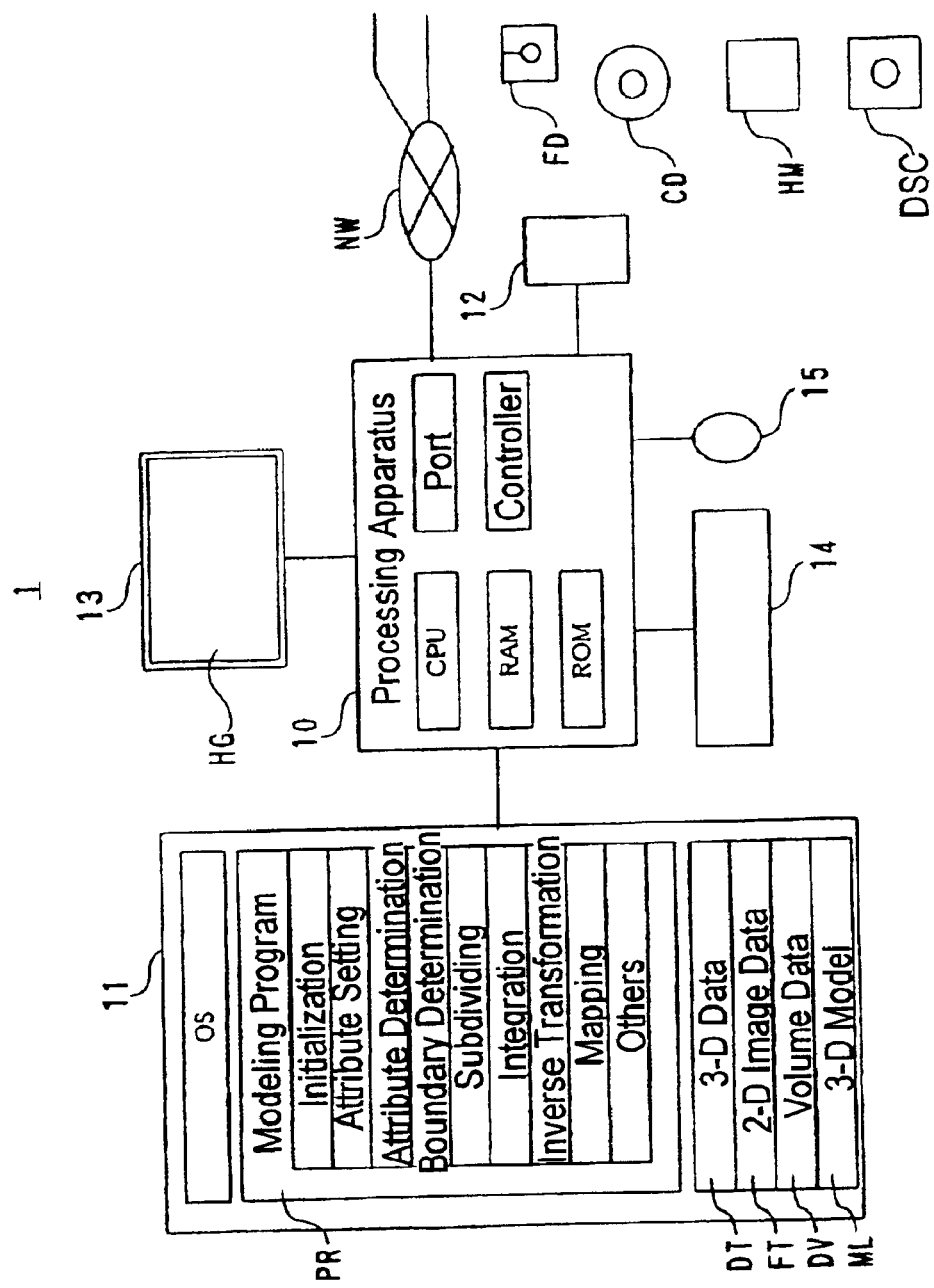
FIG. 1 is a block diagram showing a three-dimensional data generating apparatus according to Embodiment 1 of the invention.

FIG. 1 is a block diagram showing a three-dimensional data generating apparatus 1 according to Embodiment 1 of the invention.

In FIG. 1, the three-dimensional data generating apparatus 1 comprises an apparatus main body 10, a magnetic disk unit 11, a medium drive unit 12, a display unit 13, a keyboard 14, and a mouse 15.

The apparatus main body 10 comprises a CPU, a RAM, a ROM, a video RAM, input/output ports, and controllers. The CPU executes programs stored in the RAM and the ROM, and thereby implements the various function described below.

The magnetic disk unit 11 stores: an OS (operating system); a modeling program PR for generating a three-dimensional model ML; other programs; inputted three-dimensional data (three-dimensional shape data) DT; images (two-dimensional image data) FT; volume data DV; generated three-dimensional model ML; and other data. When necessary, these programs and data are loaded into the RAM of the apparatus main body 10, and thereby used by the CPU.

The modeling program PR comprises subprograms for an initialization process, an attribute setting process, an attribute determination process, a boundary determination process, a subdividing process, an integration process, an inverse transformation process, a mapping process, and other processes.

The medium drive unit 12 access a CD-ROM (CD), a floppy disk FD, a magneto-optical disk, a semiconductor memory SM (such as a compact flash memory), and other recording media, and thereby reads and writes data and programs. An appropriate drive unit is selected depending on the type of recording medium. The modeling program PR may be installed from such recording media. The three-dimensional data DT and the images FT also may be inputted through such recording media.

The monitor screen HG of the display unit 13 displays the various data, the three-dimensional data DT, and the images FT described above, as well as intermediate images, generated three-dimensional models ML, and other data and images during the process of the modeling program PR.

The keyboard 14 and the mouse 15 are used by a user for specifying various conditions onto the images FT and the three-dimensional data DT displayed on the display unit 13, as well as for inputting various data and instructions to the apparatus main body 10.

The apparatus main body 10 can be connected to a digital camera DSC for photographing an object in various directions of sight or from various points of view, and thereby inputting images FT. In case that a compact flash memory is used as the recording medium in the digital camera DSC, the compact flash memory is inserted into the medium drive unit 12, whereby the images FT are read into the apparatus main body 10. A contour of the object is extracted from each image FT, whereby a silhouette image FS is generated. On the basis of these silhouette images FS, three-dimensional data DT can be generated by the shape-from-silhouette method.

Alternatively, three-dimensional data DT can be generated by three-dimensional reconstruction on the basis of two images having parallax to each other.

Further, the apparatus main body 10 can be connected to a three-dimensional input unit (three-dimensional measurement instrument) for measuring a three-dimensional shape of an object by a non-contact method such as light-section method and thereby generating and inputting the three-dimensional data DT. Alternatively, instead of the three-dimensional data DT itself, the three-dimensional input unit may output basic data used for generating the three-dimensional data DT. In this case, the apparatus main body 10 calculates the three-dimensional data DT.

The three-dimensional data DT obtained as described above and the intermediate data for generating the three-dimensional data DT are in the form of boundary representation of the three-dimensional shape of the object.

In the embodiments, the three-dimensional shape of the object in the boundary representation form is transformed into volume data DV in which each voxel has multi-valued attribute d. The voxel is a small cube composed of a unit lattice cell when the three-dimensional space is divided into unit lattice cells.

A plurality of volume data sets DV transformed from a plurality of three-dimensional shape data sets generated by diverse methods may be integrated into a single volume data set DV.

The final volume data DV, in turn, undergoes inverse transformation into a shape representation in the boundary representation form. At that time, a known method such as zero-equivalence surface extraction method may be used. In this method, a point is calculated corresponding to the zero-equivalence surface on each side joining adjacent vertices (lattice points). These points are connected to each other, and thereby form a triangular polygon. Accordingly, a polygon mesh is obtained.

A texture image may be pasted onto the three-dimensional shape obtained by the inverse transformation. As such, a three-dimensional model ML is generated.

The three-dimensional data generating apparatus 1 may be composed of a personal computer or a workstation. The above-mentioned programs and data may be received and acquired through a network NW.

Figure 2:
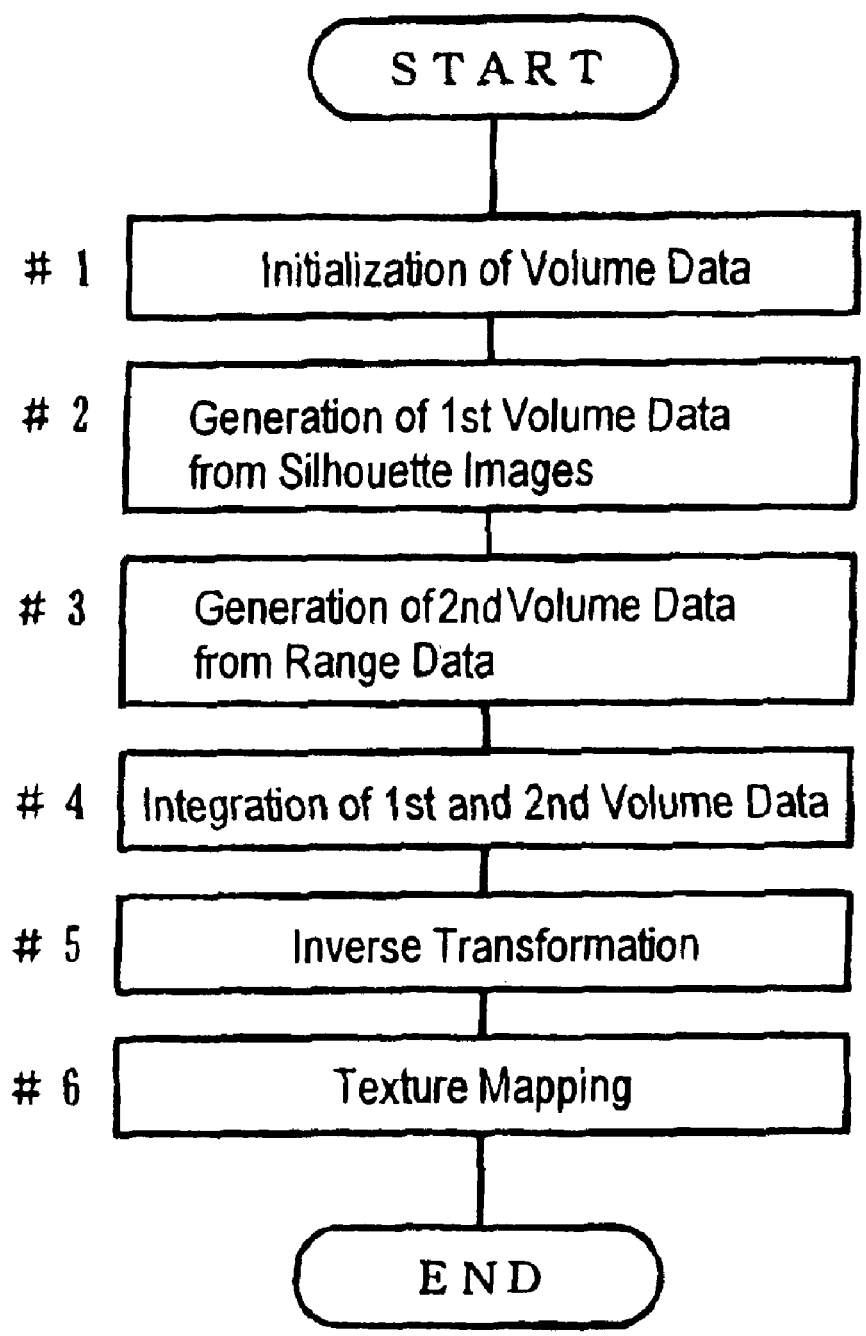
FIG. 2 is a flowchart showing the process that the three-dimensional data generating apparatus generates a three-dimensional model.

FIG. 2 is a flowchart showing the process that the three-dimensional data generating apparatus 1 generates a three-dimensional model ML.

In FIG. 2, a volume (volume data DV) having an appropriate size is prepared and initialized (#1). The volume may be composed of 50×50×50 voxels, 100×100×100 voxels, or the like. The volume does not need to be cubic. The center coordinates and the orientation of each voxel are also set in a coordinate system.

In the volume, each vertex of each voxel has two multi-valued attributes d. That is, two storage regions for storing two attributes ds and dr, respectively, are provided for each vertex. Alternatively, two volumes in each of which each vertex of each voxel has a multi-valued attribute may be provided. In this case, the two volumes are referred to as a first volume and a second volume, respectively.

In the present specification, a "volume" is referred to as "volume data" in some cases. In this case, the "volume data" indicates a three-dimensional region which is composed of voxels arranged in a predetermined shape and in which data can be assigned for each vertex of each voxel.

A vertex of a voxel is shared with adjacent voxels. Thus, a vertex not on the periphery serves as a vertex for eight voxels. A vertex is also a lattice point, and hence a "vertex" is referred to as a "lattice point" in some cases.

In FIG. 2, transformation process is carried out using silhouette images, whereby a first volume data DV is generated (#2). Then, transformation process is carried out using range data, whereby a second volume data DV is generated (#3). The range data indicates three-dimensional shape data obtained by measuring the object by means of a three-dimensional measurement instrument called a range finder. The scope of the range data includes also three-dimensional shape data reconstructed from a plurality of images having parallax to each other by means of stereography.

These first and second volume data DV are integrated (#4). The integrated volume data DV undergoes inverse transformation into a shape representation in the boundary representation form (#5). Texture mapping is carried out when necessary (#6).

Described below in detail are the transformation process into volume data VD and the integration process of a plurality of volume data sets DV. The transformation process is described first.

<<Transformation Process According to Embodiment 1>>

Figure 3:
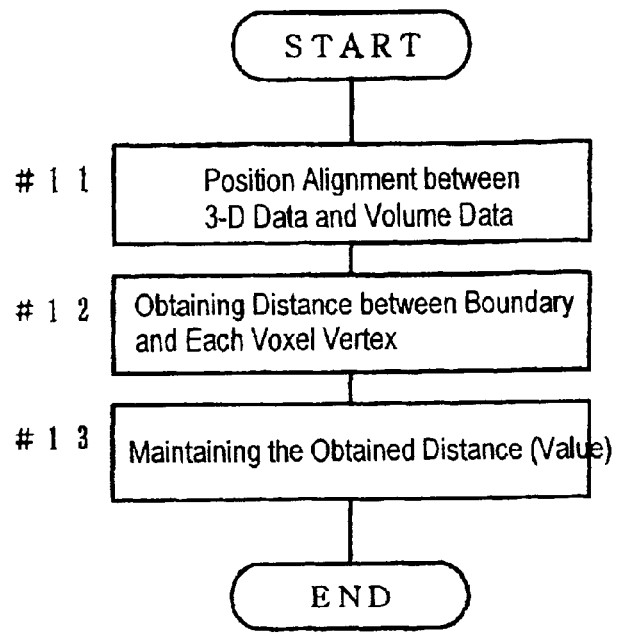
FIG. 3 is a flowchart showing a transformation process carried out by the three-dimensional data generating apparatus.
Figure 4:
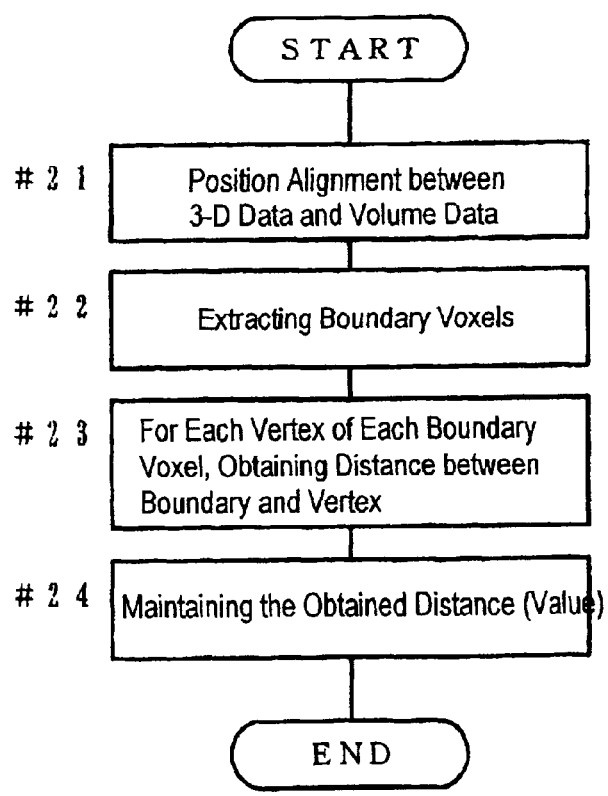
FIG. 4 is a flowchart showing an example of modification of a transformation process.

FIG. 3 is a flowchart showing a transformation process carried out by the three-dimensional data generating apparatus 1. FIG. 4 is a flowchart showing a modification of the transformation process. The transformation processes shown in these flowcharts are applied to transformation processes using range data, other three-dimensional shape data, and silhouette images as described above.

In FIG. 3, prepared first is three-dimensional data DT representing the three-dimensional shape of an object. Alternatively, instead of the three-dimensional data DT, prepared are a plurality of images FT used as the basis of generating three-dimensional data DT. Then, position alignment is carried out between the three-dimensional data DT and volume data DV (#11). In general, the size and the position of the volume data DV are determined such that the three-dimensional data DT fits into the volume data DV appropriately.

For each vertex of each voxel constituting the volume, obtained is a value corresponding to the distance from the vertex to the boundary representing the three-dimensional shape, that is, to the surface of the object (#12). The obtained value is maintained as an attribute of the vertex (#13).

As such, a multi-valued attribute is assigned to each vertex of each voxel, that is, each lattice point. Accordingly, obtained is volume data DV composed of the group of lattice points each having a multi-valued attribute.

In FIG. 4, voxels intersected by the surface of the object are extracted (#22). Such a voxel is referred to as a "boundary voxel" in some cases. For each boundary voxel, obtained is a value corresponding to the distance from the vertex to the surface of the object (#23). The obtained value is maintained as an attribute of the vertex (#24) similarly to the above-mentioned case.

When a vertex is shared by a boundary voxel and a non-boundary voxel, the vertex is treated as a vertex of a boundary voxel.

<<Transformation Process According to Embodiment 2>>

The transformation process is described below in further detail with reference to Embodiment 2. Embodiments 2 and 3 are applied mainly to a transformation process using silhouette images.

Figure 5:
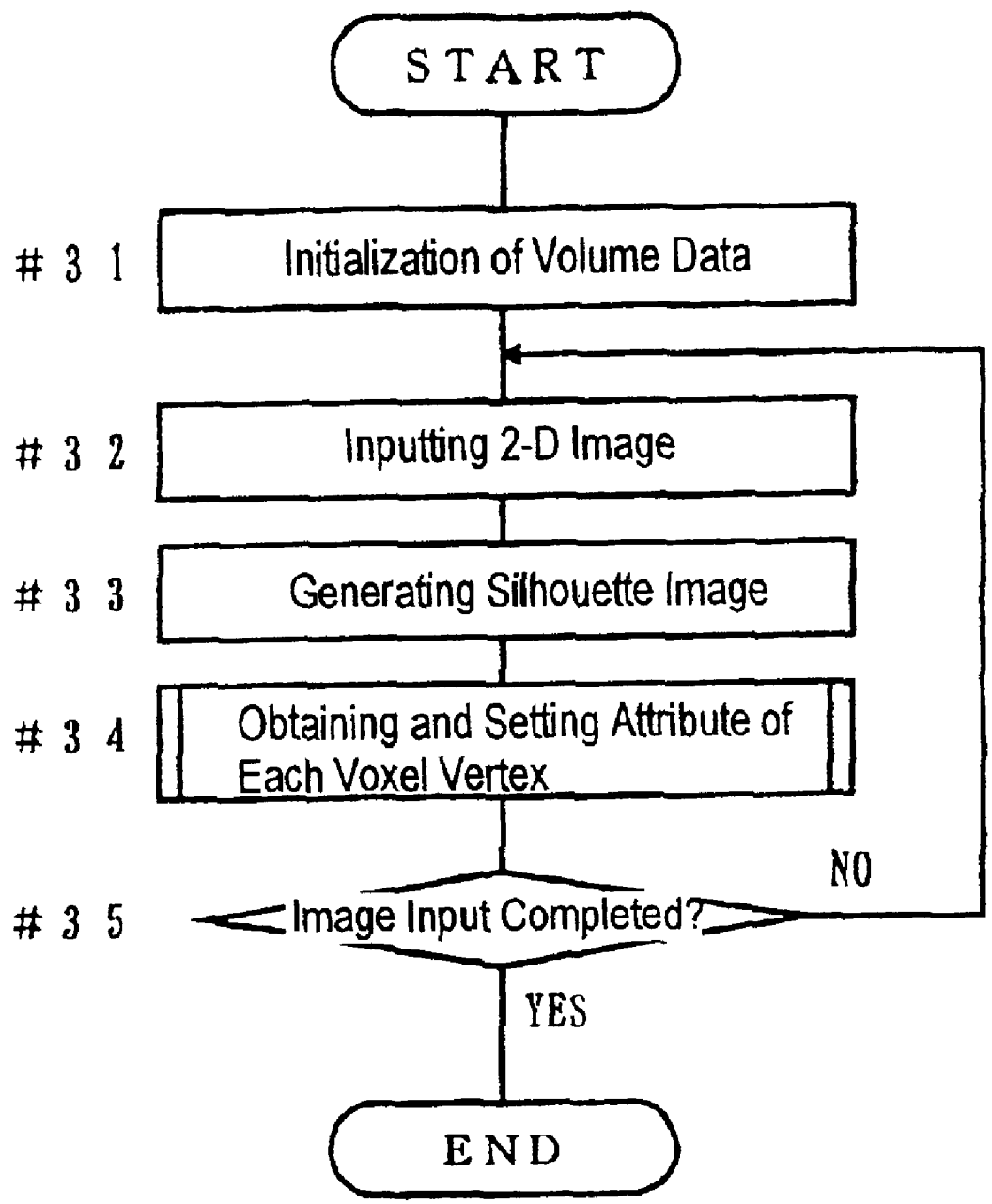
FIG. 5 is a flowchart showing a transformation process according to Embodiment 2.
Figure 6:
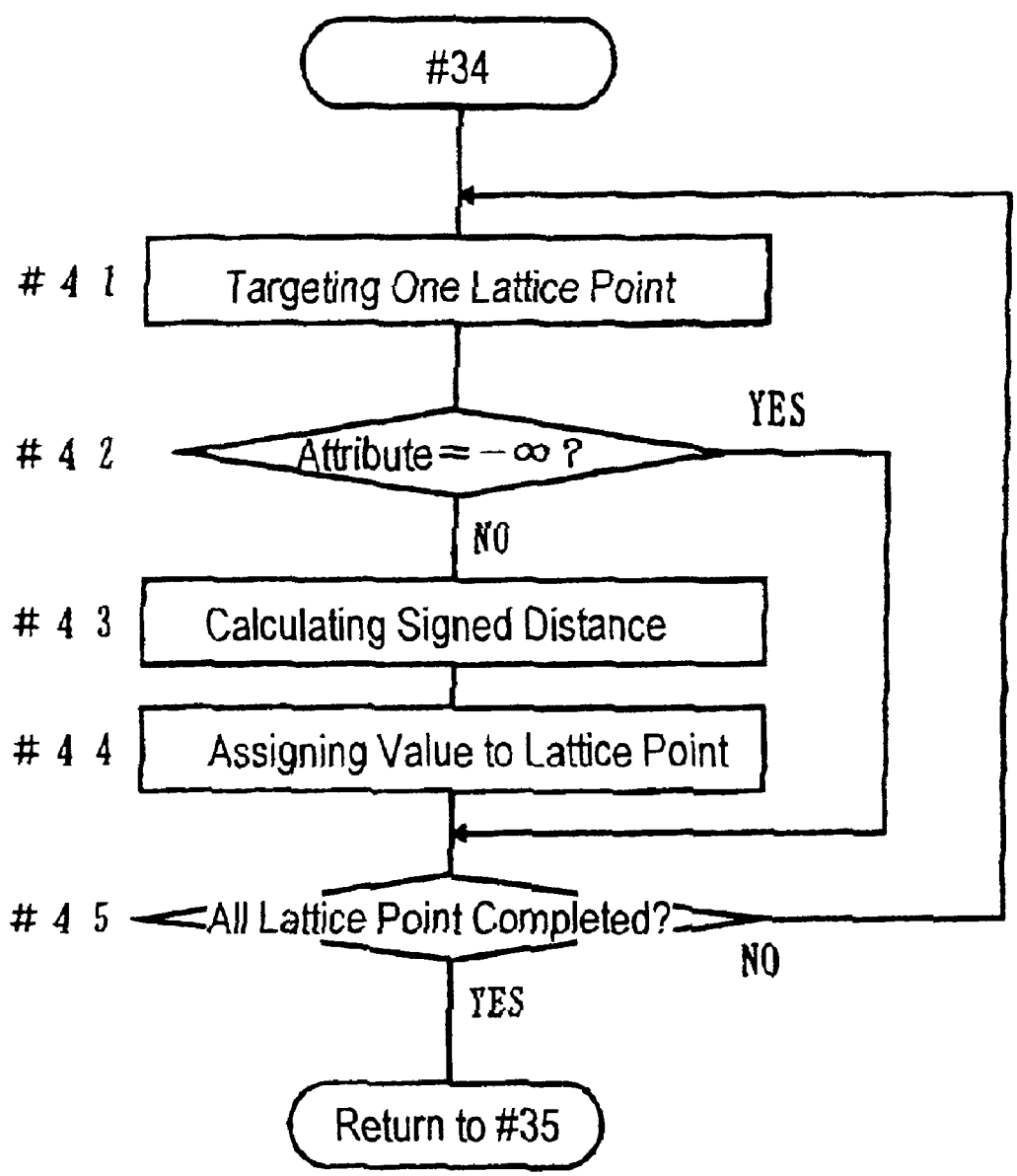
FIG. 6 is a flowchart of a subroutine for an attribute setting process in Step #34 shown in FIG. 5.
Figure 7:
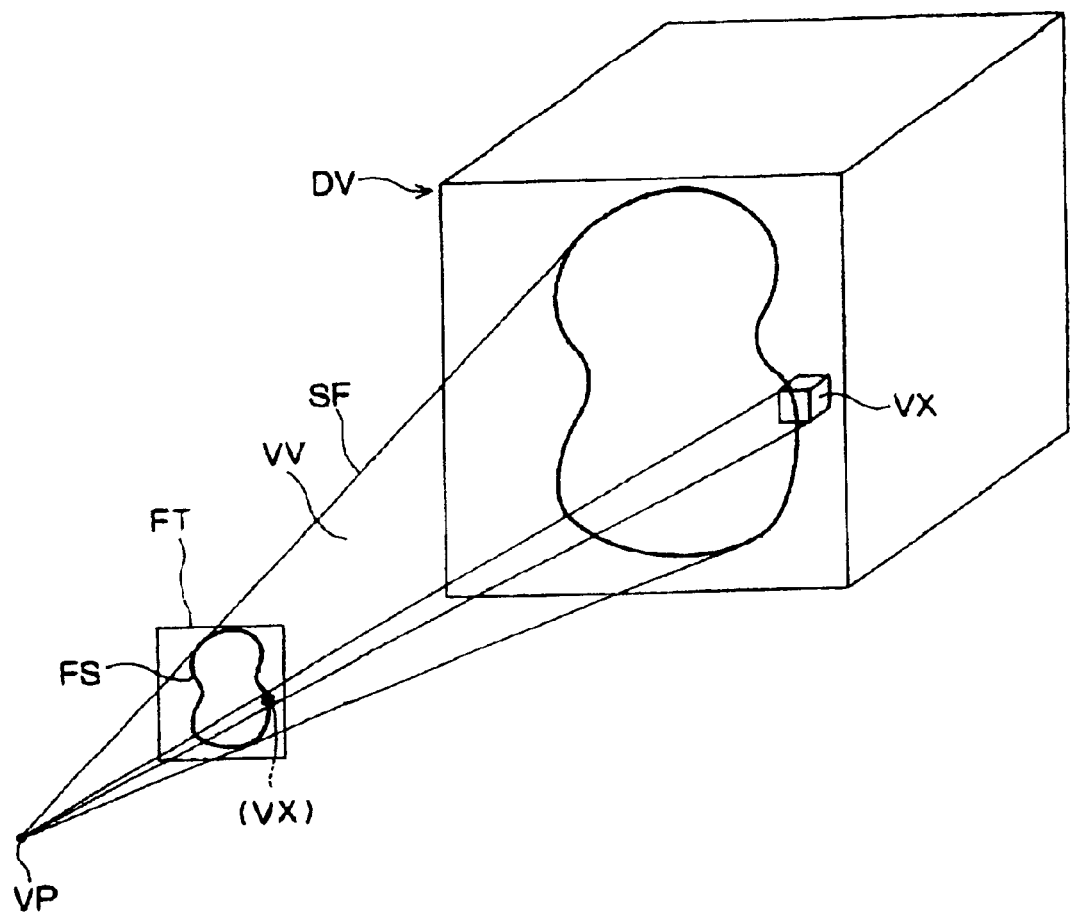
FIG. 7 illustrates the situation that a silhouette image is projected onto volume data.
Figure 8:
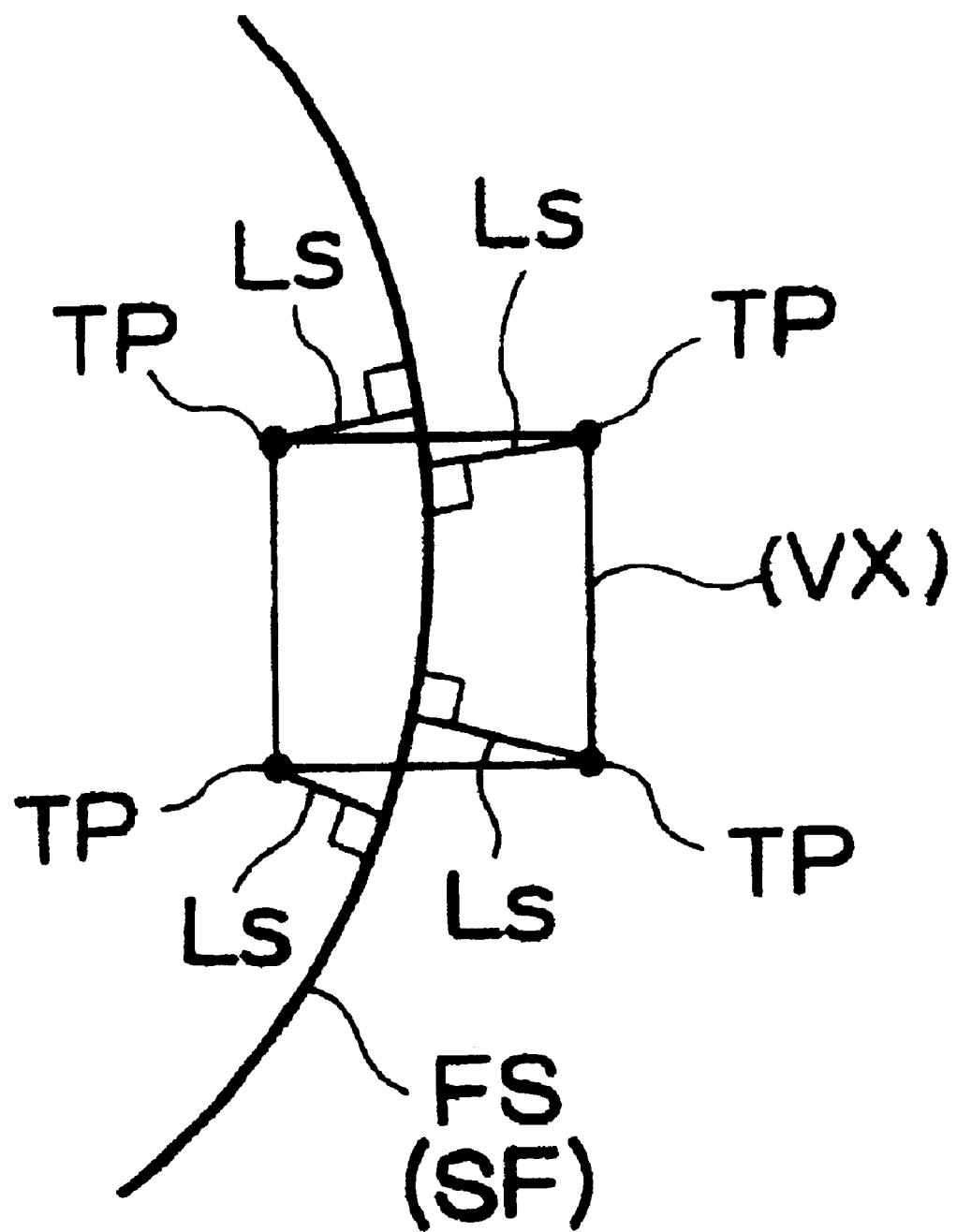
FIG. 8 shows an expanded view of a portion of the silhouette image shown in FIG. 7.
Figure 9:
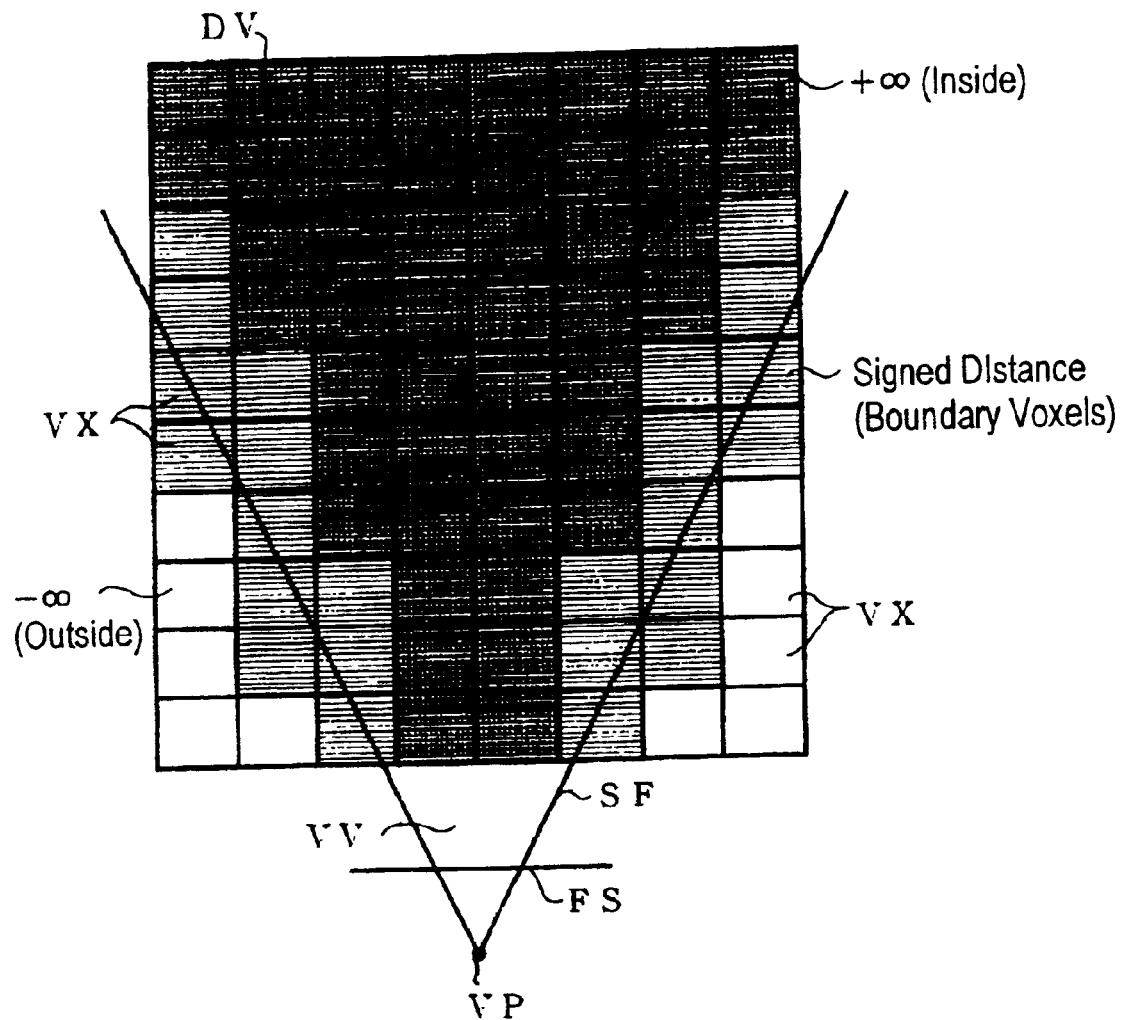
FIG. 9 shows a horizontal cross sectional view of volume data.
Figure 10:
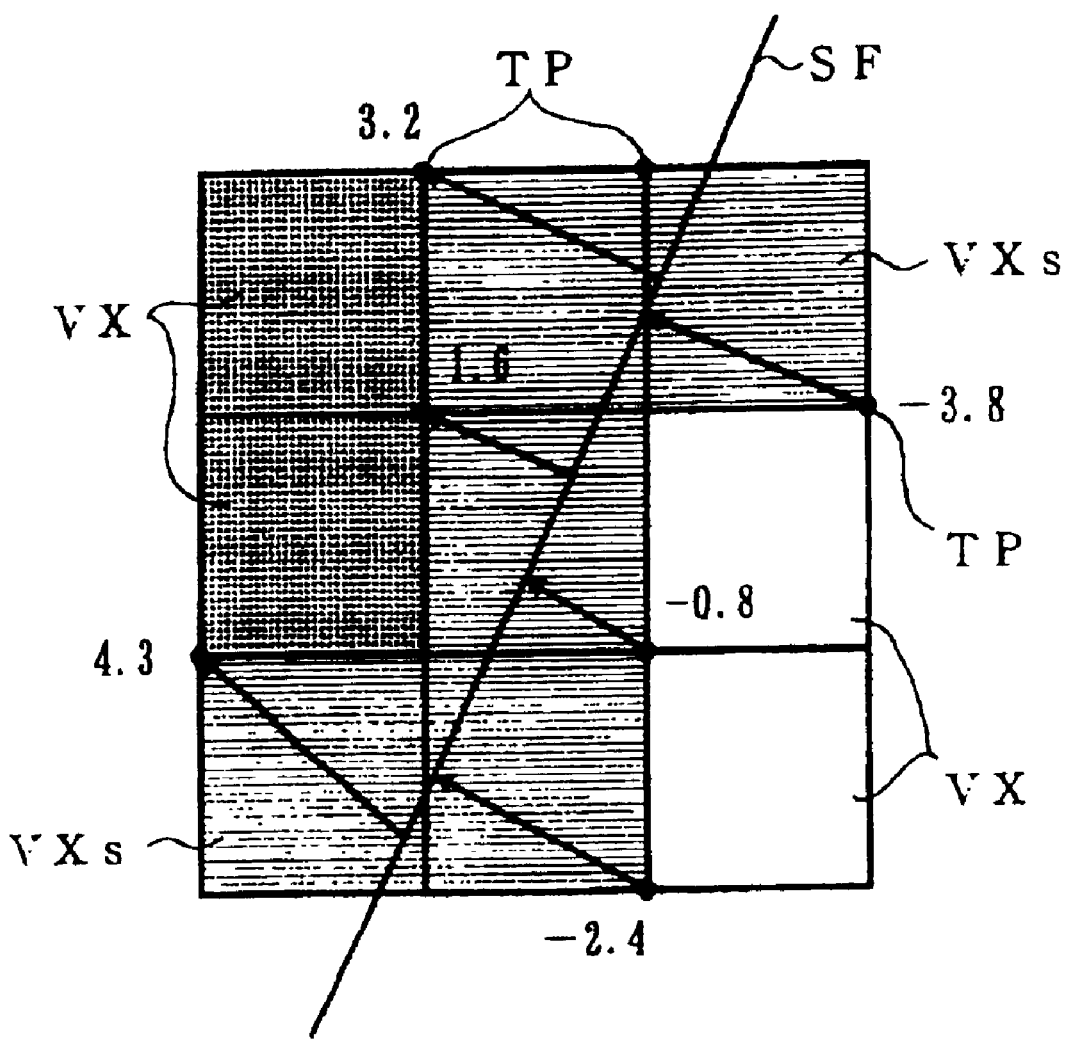
FIG. 10 shows an expanded view of boundary voxels.
Figures 11, 12:
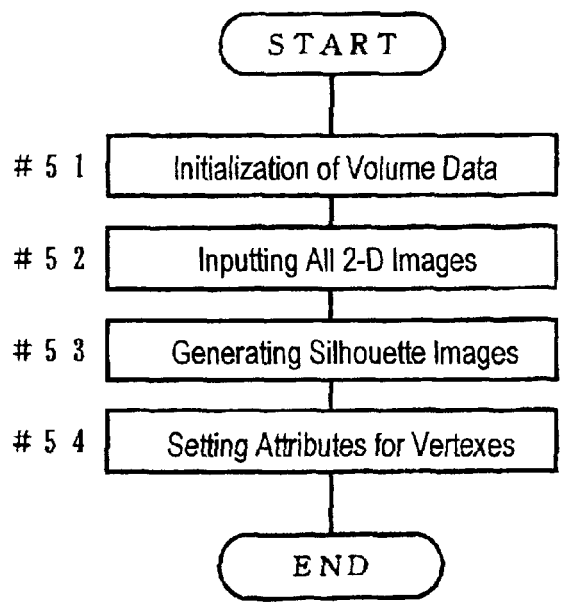
FIG. 11 shows an example of a volume table for storing volume data.
FIG. 12 is a flowchart showing a transformation process according to Embodiment 3.

FIG. 5 is a flowchart showing a transformation process according to Embodiment 2. FIG. 6 is a flowchart of a subroutine for an attribute setting process in Step #34 shown in FIG. 5. FIG. 7 illustrates the situation that a silhouette image FS is projected onto volume data DV. FIG. 8 shows an enlarged view of a portion of the silhouette image FS shown in FIG. 7. FIG. 9 shows a horizontal cross sectional view of volume data DV. FIG. 10 shows an enlarged view of boundary voxels. FIG. 11 shows an example of a volume table TLs for storing volume data DV.

In FIG. 5, in defined volume data DV, an initial value is first assigned to each lattice point TP. As such, the volume data DV is initialized (#31). The initial value for each lattice point TP is, for example, "positive infinity" which indicates the inside of the object. On completion of the initialization, the volume data DV shown in FIG. 10 has the initial value at each point.

An image FT is then inputted (#32). At this time, camera parameters used for the photography of the image FT are also inputted. The camera parameters include: a camera inside matrix such as the focal length; and a camera outside matrix such as the position of the point of view. A projection matrix containing these matrices may be inputted. On the basis of the camera parameters, the position of the point of view and the direction of projection are determined for the projection of the image FT onto the volume data DV.

When the image FT is inputted in Step #32, the image FT is stored in the magnetic disk unit 11. The image FT stored in the magnetic disk unit 11 is automatically read out into the RAM, and then processed subsequently. However, the inputting of an image in Step #32 may be interpreted as the reading-out of the image FT stored in the magnetic disk unit 11 into the RAM. In this case, a large number of images FT are stored in the magnetic disk unit 11 in advance, whereby an image FT specified in Step #32 is read out into the RAM. Further, the inputting of an image may be interpreted as the specifying of an image FT to be processed among a large number of the images FT stored in the magnetic disk unit 11.

From the inputted image FT, the contour of the object is extracted, whereby a silhouette image FS is generated (#33). The silhouette image FS provides solely the contour, and hence may be monochrome. The silhouette image is generated automatically or manually by a known method.

The volume data DV is set (#34). That is, the attribute of each vertex (lattice point) TP of each voxel VX is obtained and set. The attribute is the signed distance between the vertex TP and the object surface. That is, as shown in FIGS. 7 and 8, the distance is defined as the distance Ls to the vertex TP from the boundary SF of the viewed volume VV defined by the contour (screen contour) in the silhouette image FS and by the point of view VP. Further, the sign of the distance is defined as positive when the vector from the boundary SF to the vertex TP directs inward of the viewed volume VV. Further detail is described later.

When there remains an image FT to be processed (NO in #35), the next image is inputted (#32). The above-mentioned processes (Steps #32–#34) are repeated until all the images FT have been processed appropriately (#35). Even after all the initially prepared images FT are processed, some images FT may be added for the processes in Steps #32–#34 when necessary.

In Step #32, instead of inputting an image FT, a silhouette image FS may be directly inputted. In this case, Step #33 is omitted.

In FIG. 6, in the attribute setting, one lattice point TP constituting the volume is targeted at first (#41). The attribute of the target lattice point TP is checked (#42). When the attribute is "negative infinity" (YES in #42), the procedure skips to Step #45. Here, the attribute value "negative infinity" indicates that the lattice point TP is located outside the object. Each lattice point LP located outside the object is removed. Accordingly, a more precise value is unnecessary for such a lattice point.

In the processing of the first image, all the lattice points have the initial value "positive infinity". Accordingly, the procedure always goes to Step #43. In contrast, in the processing of the subsequent images, an attribute value "positive infinity", "negative infinity", or later-described "signed distance ds" is assigned in the processing of the preceding image. Then, the procedure goes to Step #43 in case of "positive infinity" or "signed distance ds", that is, other than "negative infinity".

In the case other than the attribute "negative infinity", the signed distance ds is calculated in Step #43. The signed distance ds can be calculated by several methods. Described below are a first through a third method.

<<First Method>>

A target lattice point TP and each lattice point adjacent to the target lattice point TP (that is, each vertex in the same voxel VX) are projected towards the point of view VP onto the image FT. When the side formed by joining the projected points on the image FT intersects the contour (screen contour), the signed distance is calculated.

That is, as shown in FIG. 7, when a voxel VX is located on the boundary SF of the viewed volume VV, the voxel VX is a boundary voxel VXs. The signed distance is calculated for each lattice point TP of the boundary voxel VXs.

In FIG. 9, voxels VX intersected by the boundary SF of the viewed volume VV are boundary voxels VXs, and thereby shown in gray color. In FIG. 10, obtained is the distance from each vertex TP of each boundary voxel VXs to the boundary SF of the viewed volume VV. The obtained distance, or alternatively a value corresponding to the distance, is shown as the attribute of the vertex TP.

The unit or the scale of the distance may be arbitrary. The maximum value of the distance is the length of the diagonal line of the voxel VX. Accordingly, the distance may be normalized using the length of the diagonal line as the unit. Here, a vertex TP located inside the viewed volume VV has a positive distance, whereas a vertex TP located outside has a negative distance.

For example, in case that the attribute is expressed as eight-bit data, the most significant bit is used as the signature bit, while the other seven bits express the distance. In this case, a value is expressed between −127 and +128. The value "−127" is used as "negative infinity" indicating the outside, while the value "+128" is used as "positive infinity" indicating the inside. A value between −126 and +127 are used as the signed distance. The attribute may be expressed as 12-bit data, 16-bit data, or other data having a different number of bits.

As such, when a lattice point TP is located on the boundary SF of the viewed volume VV, the attribute thereof has the zero value. When a lattice point TP is located deeper inside of the viewed volume VV, the attribute has a higher value. On the contrary, a lattice point TP is located outside farther from the viewed volume VV, the attribute has a lower value.

When no side is intersected by the screen contour, that is, when the voxel is not a boundary voxel VXs, the lattice points TP thereof are located inside or outside the viewed volume VV. In case of outside, the lattice points TP are to be removed, and hence the attribute values are set to be "negative infinity". In case of inside, the attribute values are left intact as "positive infinity".

<<Second Method>>

A target lattice point TP is projected towards the point of view VP onto the image FT. It is checked whether the screen contour intersects a circle having a predetermined radius around the projected point. When the screen contour intersects the circle, the signed distance is calculated. When the screen contour does not intersect the circle, and when the lattice point TP is located outside the viewed volume VV, the attribute is set to be "negative infinity".

<<Third Method>>

The screen contour is sampled in equal spacing, whereby straight lines each joining a sampled point and the point of view VP are obtained. These lines are lines of sight each intersecting the screen contour. Using the lines of sight instead of the boundary SF of the viewed volume VV, the signed distance is calculated in the three dimension. That is, for each vertex TP of a boundary voxel VXs, the distance is calculated from the vertex TP to the line of sight. When the lattice point TP under consideration is located outside the viewed volume VV, the attribute is set to be "negative infinity".

After the calculation of the signed distance as described above, the attribute is assigned to the target lattice point TP in Step #44. In the attribute setting, the attribute is set newly only when the new attribute value is lower than the existing attribute value. When the new attribute value is higher than the existing attribute value, the new attribute value is neglected.

That is, when the new attribute value is "negative infinity", the attribute is set to be "negative infinity" regardless of the existing attribute value. As such, the region outside the object is successively removed.

When both the new and existing attribute values are signed distance, the averaged value thereof may be assigned to the attribute d.

It is checked whether all the lattice points TP have been processed (#45). When there remains a lattice point TP to be processed, Step #41 and the subsequent steps are repeated. When all the lattice points TP have been processed, the procedure returns. As a result, a volume table TLs is obtained as shown in FIG. 11.

In Embodiment 2, processing is on a single image FT basis. Accordingly, on completion of the processing of an image, the image may be deleted. This reduces the memory capacity necessary for the processing.

<<Transformation Process according to Embodiment 3>>

In the transformation process according to Embodiment 2, images FT have been added successively, whereby the transformation process has been carried out. However, a plurality of images FT may be inputted (read) at once at first, whereby the processing may be carried out. This approach is described below as Embodiment 3.

Figure 13:
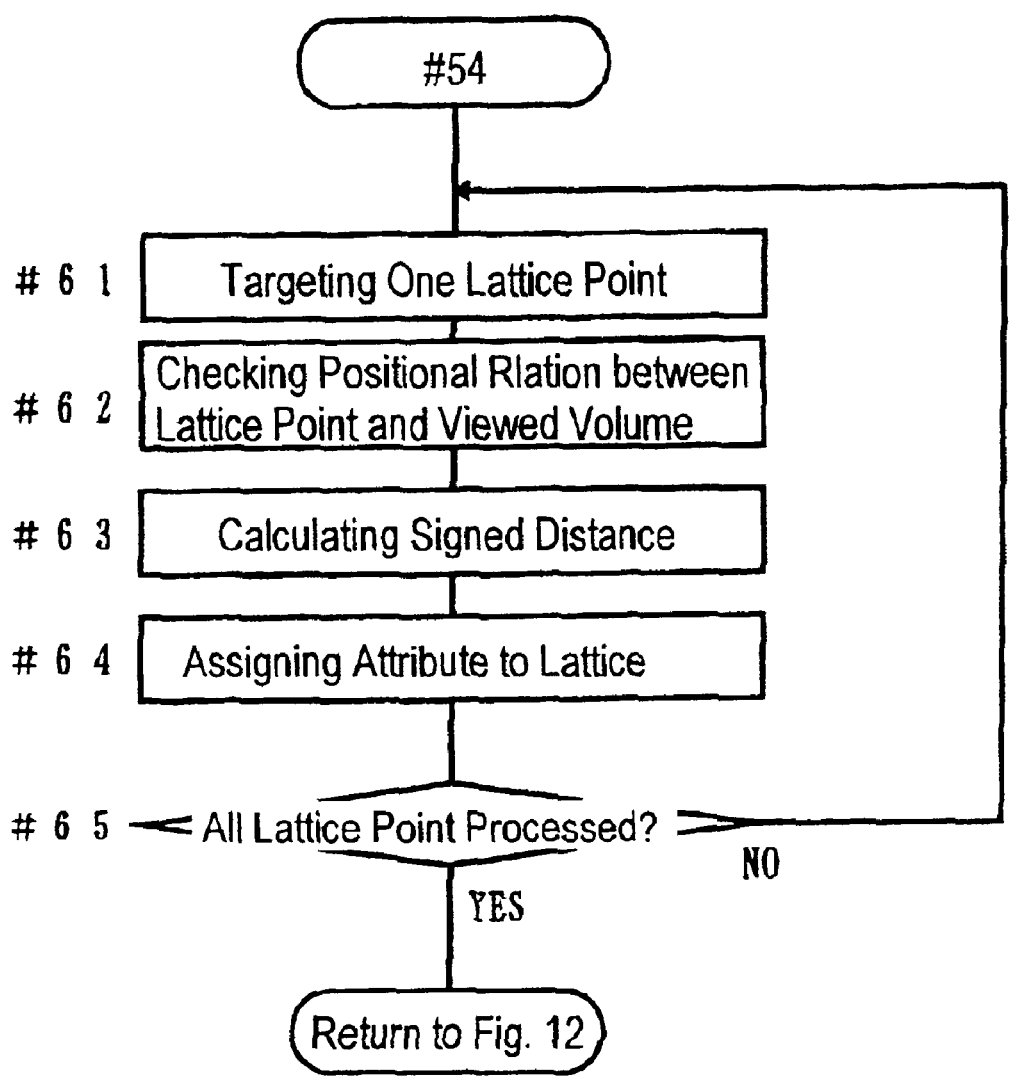
FIG. 13 is a flowchart of a subroutine for an attribute setting process in Step #54 shown in FIG. 12.

FIG. 12 is a flowchart showing a transformation process according to Embodiment 3. FIG. 13 is a flowchart of a subroutine for an attribute setting process in Step #54 shown in FIG. 12.

In FIG. 12, Step #51 is the same as Step #31 shown in FIG. 5. In Step #52, all the images FT obtained from the photography of an object are inputted at once. At this time, camera parameters used for the photography of each image FT are also inputted. A silhouette image FS is generated for each image FT (#53) similarly to Step #33. Then, the attributes are set (#54).

In FIG. 13, in the attribute setting, one lattice point TP is targeted at first (#61) similarly to Step #41. It is checked the positional relation of the target lattice point TP relative to the viewed volume VV(#62).

At that time, when the lattice point TP is located in the vicinity of the boundary SF of the viewed volume VV, the attribute is set preliminarily to be "boundary". When the location is inside the viewed volume VV, the attribute is set to be "inside", while when the location is outside the object, the attribute is set to be "outside". Described below are two methods of checking.

<<First Method>>

A target lattice point TP and all the lattice points adjacent thereto are projected onto all the images FT. It is checked whether each side formed by joining projected points on each image FT intersects the contour (screen contour). When any side intersects the screen contour in any image FT, the lattice point TP is determined as being located in the vicinity of the boundary SF of the viewed volume VV, whereby the attribute is set preliminarily to be "boundary". When no side intersects the screen contour in every image FT, and when the projected point of the lattice point TP is located outside the screen contour in any image FT, the lattice point TP is determined as being located outside the object, whereby the attribute is set preliminarily to be "outside". Otherwise, the lattice point TP is determined as being located inside the object, whereby the attribute is set preliminarily to be "inside".

<<Second Method>>

A target lattice point TP is projected onto each image FT. In each image FT, it is checked whether the screen contour intersects a circle having a predetermined radius around the projected point. When the screen contour intersects the circle in any image FT, the lattice point TP is determined as being located in the vicinity of the boundary SF of the viewed volume VV. When the screen contour does not intersect the circle in every image FT, and when the projected point of the lattice point TP is located outside the screen contour in any image FT, the lattice point TP is determined as being located outside the object. Otherwise, the lattice point TP is determined as being located inside the object.

As such, the attribute value of a lattice point TP is preliminarily determined with considering all the images FT.

When the preliminary attribute value is "outside" or "inside", the attribute value is set to be "negative infinity" or "positive infinity", respectively. When the preliminary attribute value is "boundary", the signed distance is calculated (#63).

The method of calculating the signed distance is essentially the same as that described above in Step #43. However, in the present embodiment, the signed distance for a lattice point TP is determined with considering all the images FT. That is, the signed distance is calculated as follows.

<<First Method>>

A target lattice point TP is projected onto each image FT. Among all of these images FT, selected is an image FT having the shortest distance from the projected point to the screen contour. For the selected image FT, the line of sight passing through the point on the screen contour is obtained. The distance from the lattice point TP to the line of sight is obtained. The obtained distance is assigned to the attribute with adjusting the sign thereof <<Second Method>>

The screen contour is sampled in equal spacing in each image FT. Then, similarly to the third method in Step #34, using the lines of sight each intersecting the screen contour, the signed distance is calculated in the three dimension.

After the calculation of the signed distance as described above, the attribute is assigned to the lattice point TP in Step #64 similarly to Step #44. However, in the present step, the final attribute value is assigned to the lattice point TP.

In Step #65, similarly to Step #45, it is checked whether all the lattice points TP have been processed.

In Embodiment 3, signed distance is calculated only for lattice points TP having the preliminary attribute value "boundary". This reduces significantly the amount of calculation of the signed distance, and thereby speeds up the process.

<<Transformation Process According to Embodiment 4>>

Transformation process using an octree representation is described below as Embodiment 4.

Figure 14:
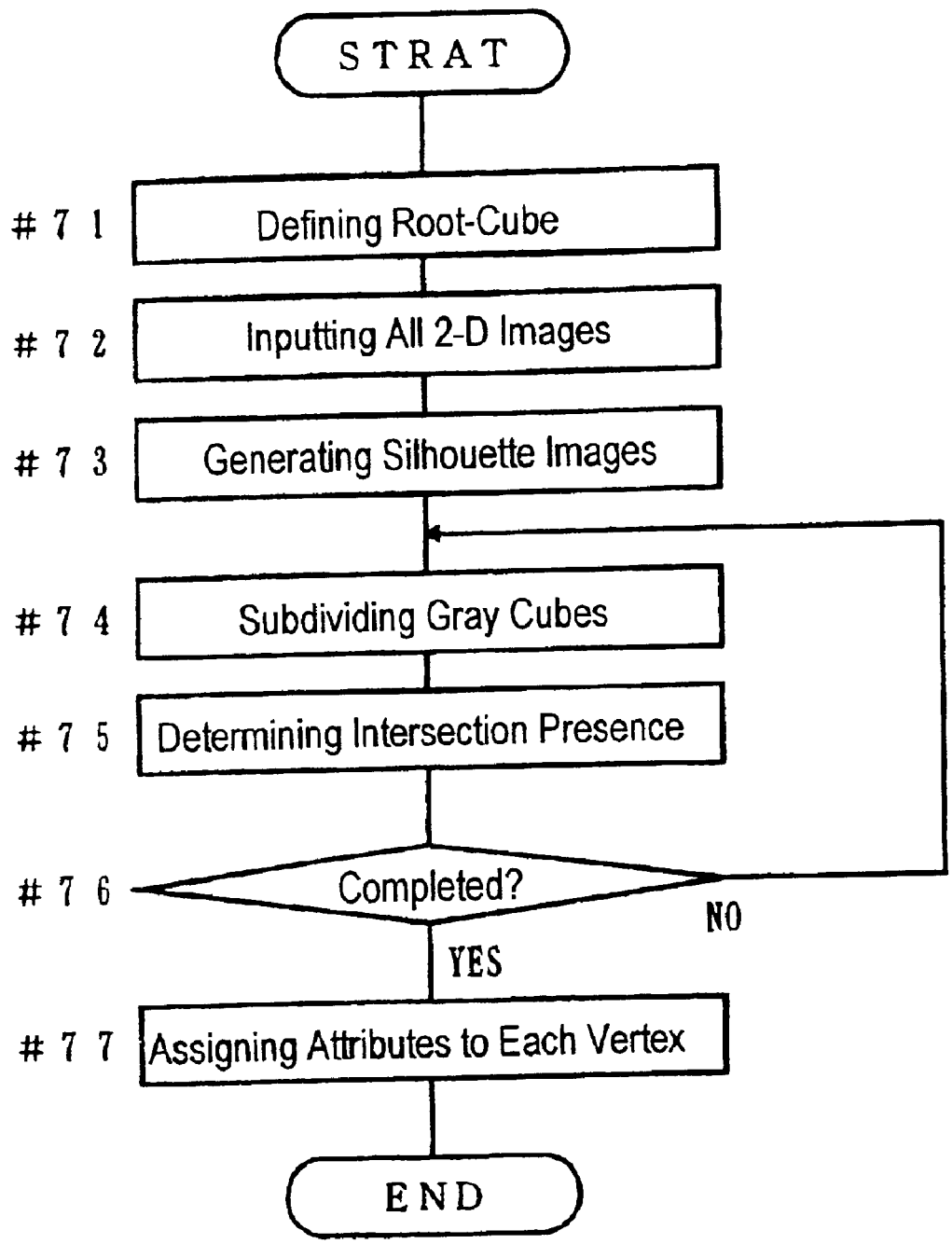
FIG. 14 is a flowchart showing a transformation process according to Embodiment 4.
Figure 15:
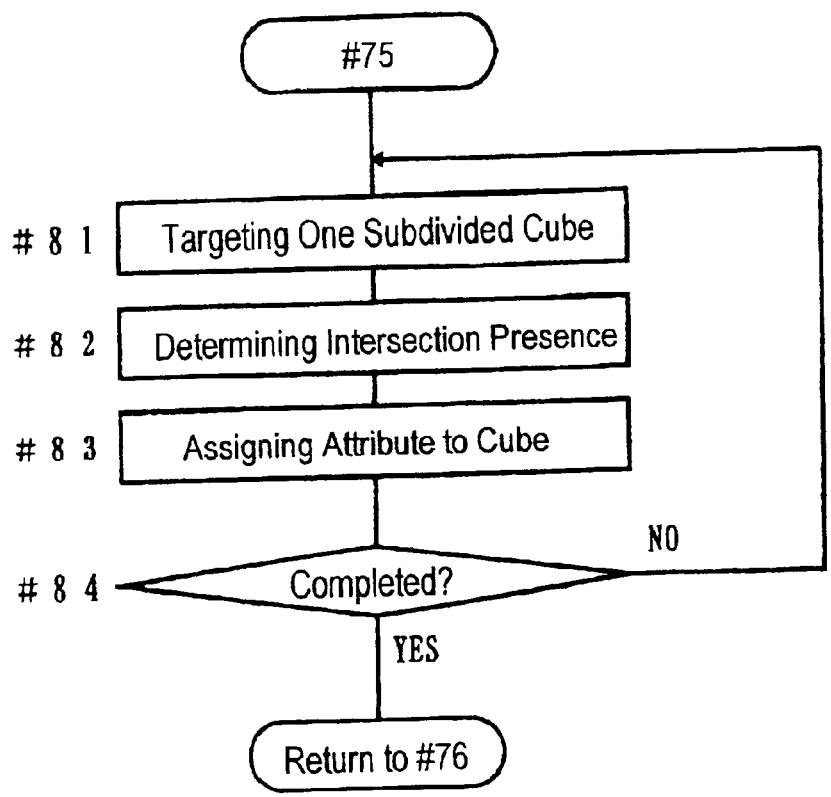
FIG. 15 is a flowchart of a subroutine for an intersection determination process in Step #75 shown in FIG. 14.
Figure 16:
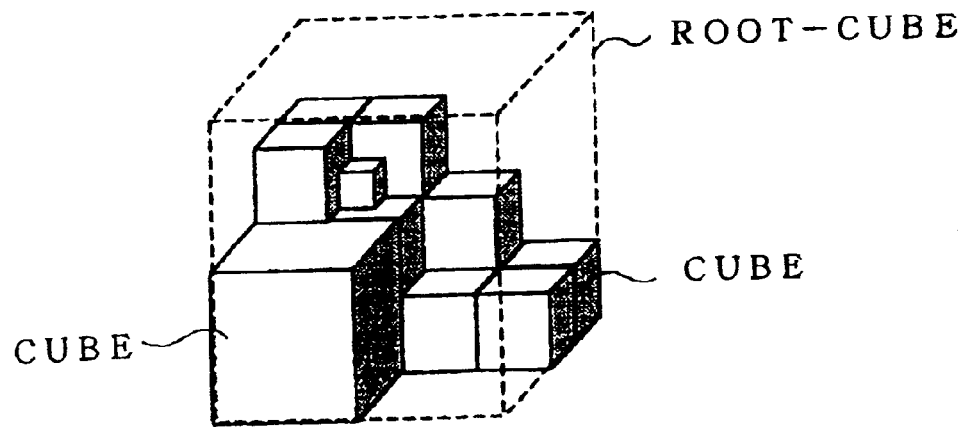
FIGS. 16 and 17 illustrate the principle of octree representation.
Figure 17:
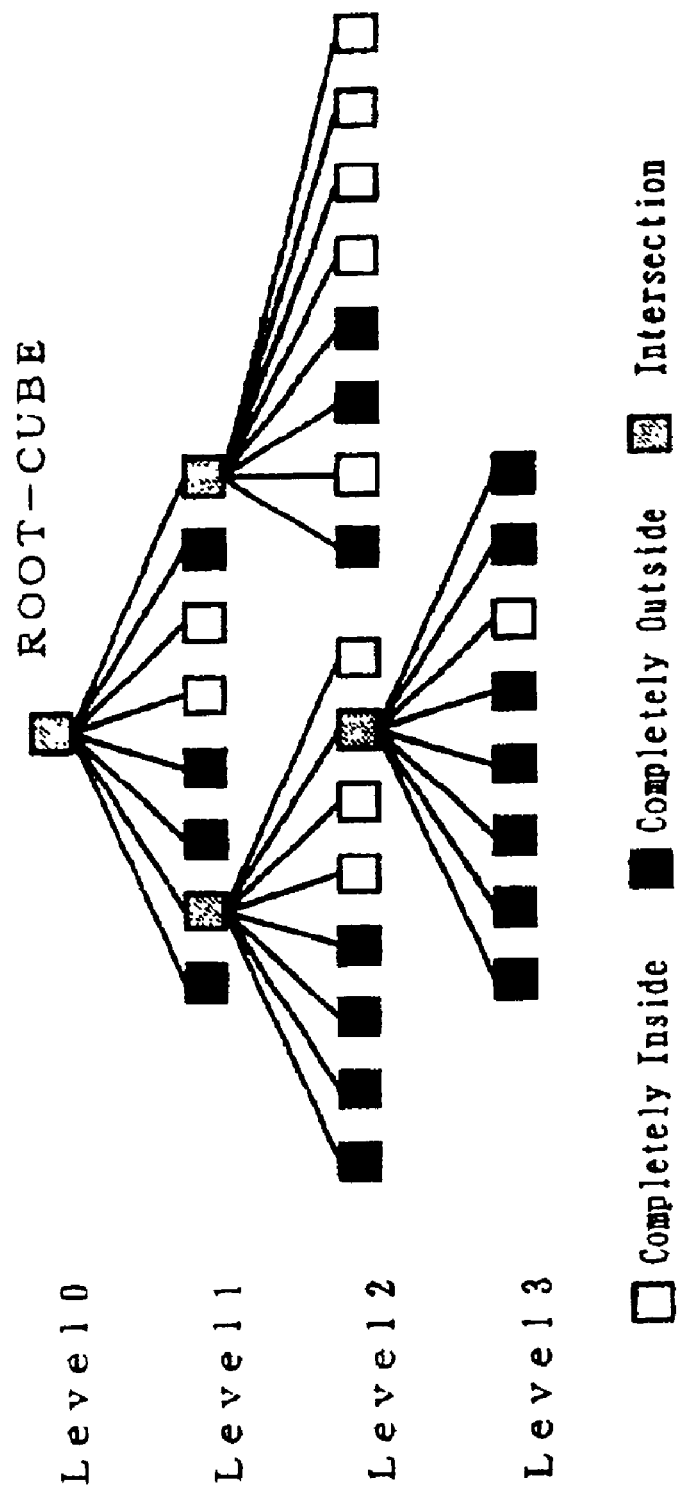

FIG. 14 is a flowchart showing a transformation process according to Embodiment 4. FIG. 15 is a flowchart of a subroutine for an intersection determination process in Step #75 shown in FIG. 14. FIGS. 16 and 17 illustrate the principle of octree representation.

As shown in FIGS. 16 and 17, in octree representation, a cube larger than the object is defined as a root cube RC. When the root cube is divided into two in each of the x-, y-, and z-directions, obtained are eight cubes each having one-eighth the original volume. When such a dividing operation is repeated recursively to a predetermined level, octree data is obtained. The octree representation is known to the public.

FIG. 14, a root cube is defined at first (#71). In the definition of the root cube, the center coordinates and the size thereof are inputted. At the same time, the initial value "CO" indicating the inside of the object is assigned to each vertex of the root cube. Further, the attribute of the root cube is set to be "gray" indicating intersection with the screen contour. The level of the root cube is set to be 0.

All the necessary images FT obtained from the photography of the object are inputted (#72). At this time, camera parameters used for the photography of each image FT are also inputted.

In Step #73, a silhouette image FS is generated for each image FT similarly to Step #33.

In Step #74, the cube (root cube) is subdivided. In this dividing, cubes having the attribute "gray" are solely subdivided. The dividing is that into eight. The level is incremented by one.

In Step #75, intersecting of the cube is determined. In the present embodiment, each subdivided cube is projected onto the images FT, whereby the presence or absence of intersection with the screen contour is determined. On the basis of the determination result, the attribute of the cube is determined.

The processes in Steps #74 and #75 are repeated into a predetermined level (#76). However, when there remains no cube having the attribute "gray", the procedure is terminated. In this case, cubes which are located on the boundary or cubes a vertex of which is located on the boundary are used as cubes having the attribute "gray" in the subsequent processes.

After the process, the attribute of each vertex of the cubes having the attribute "gray" is obtained and assigned (#77). The method of obtaining the attribute of each vertex may be the same as that in Embodiment 2.

In FIG. 15, one of the subdivided cubes is taegeted (#81). The cube is projected onto all the images FT. In each image FT, the presence or absence of intersection with the screen contour is determined (#82).

As a result of the determination, when intersection with the screen contour is present in any image FT, the attribute of the cube is set to be "gray". When the projected cube is located inside the screen contour in every image FT, the attribute of the cube is set to be "white" indicating the inside of the object. When the projected cube is located outside the screen contour in every image FT, the attribute of the cube is set to be "black" indicating the outside of the object (#83). The "gray", "white", and "black" correspond to the above-mentioned "boundary", "inside", and "outside", respectively.

When all the eight subdivided cubes have been processed (YES in #84), the process is completed.

In Embodiment 4, signed distance is calculated only for lattice points TP having the attribute value "gray". This reduces significantly the amount of calculation of the signed distance, and thereby speeds up the process.

As described above, in the transformation processes according to Embodiments 1–4, multi-valued data is assigned to each lattice point TP. By virtue of this, a small number of voxels VX can represent precisely the three-dimensional shape. Thus, a small amount of memory capacity can represent precisely the three-dimensional shape of an object.

The above-mentioned transformation processes according to Embodiments 2–4 are applied mainly to silhouette images. A transformation process applied mainly to range data is described below in detail.

<<Transformation Process According to Embodiment 5>>

Figure 18:
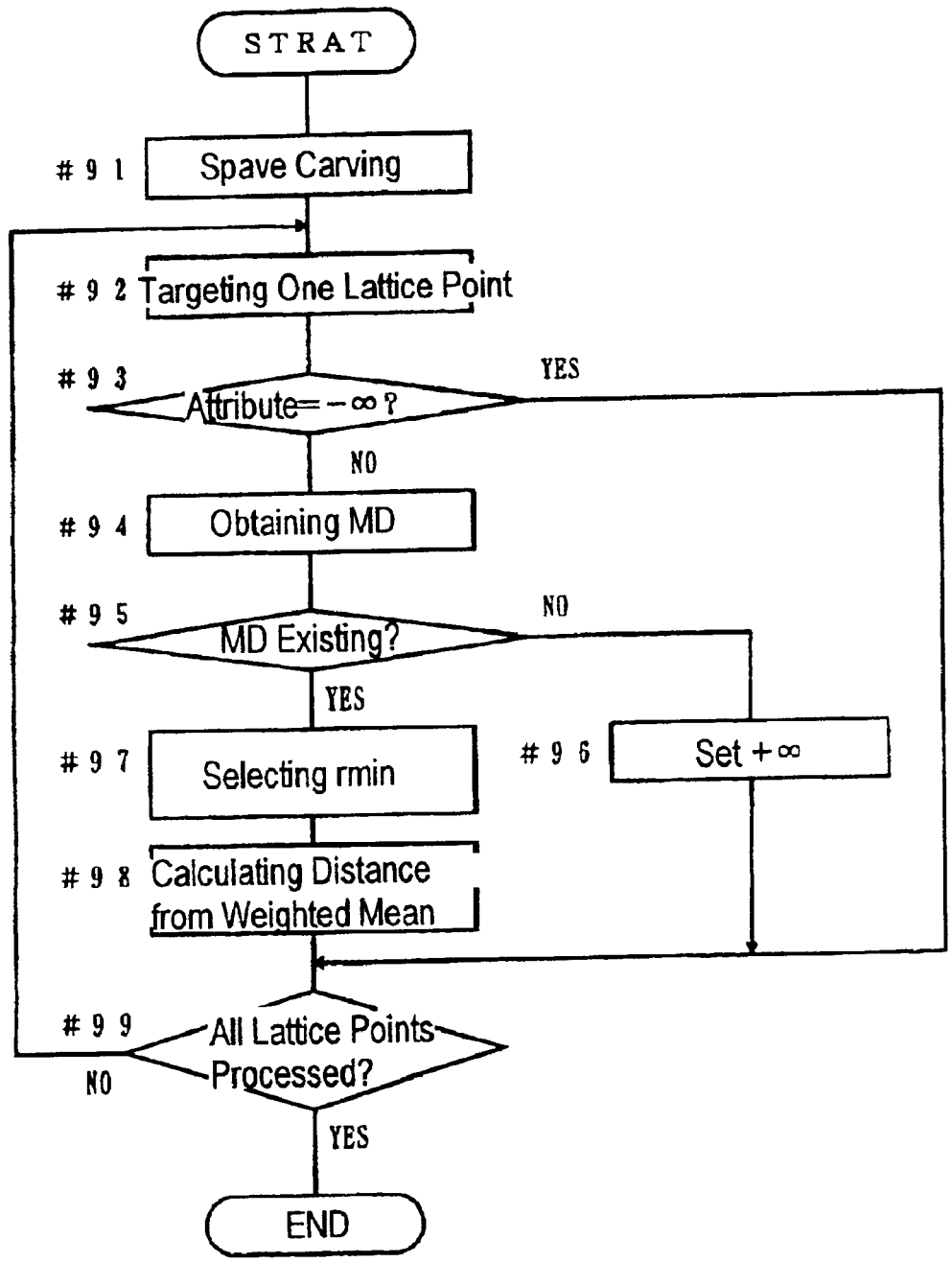
FIG. 18 is a flowchart showing a transformation process according to Embodiment 5.
Figure 19:
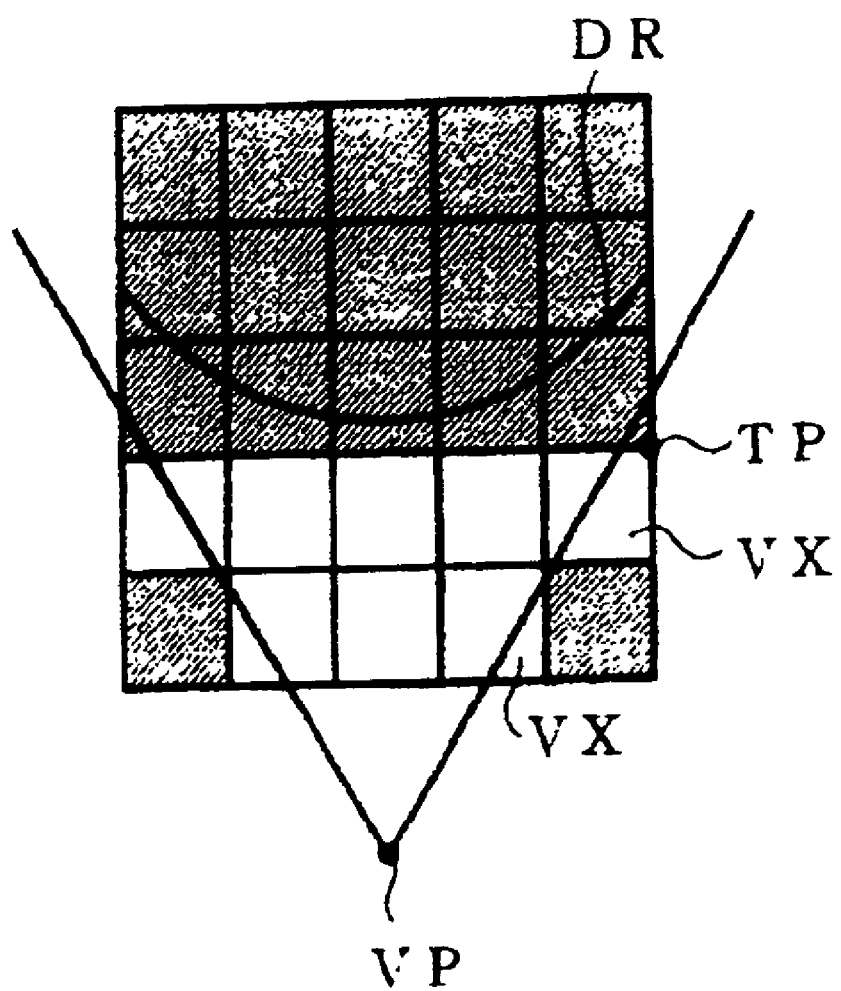
FIG. 19 illustrates space carving.
Figure 20:
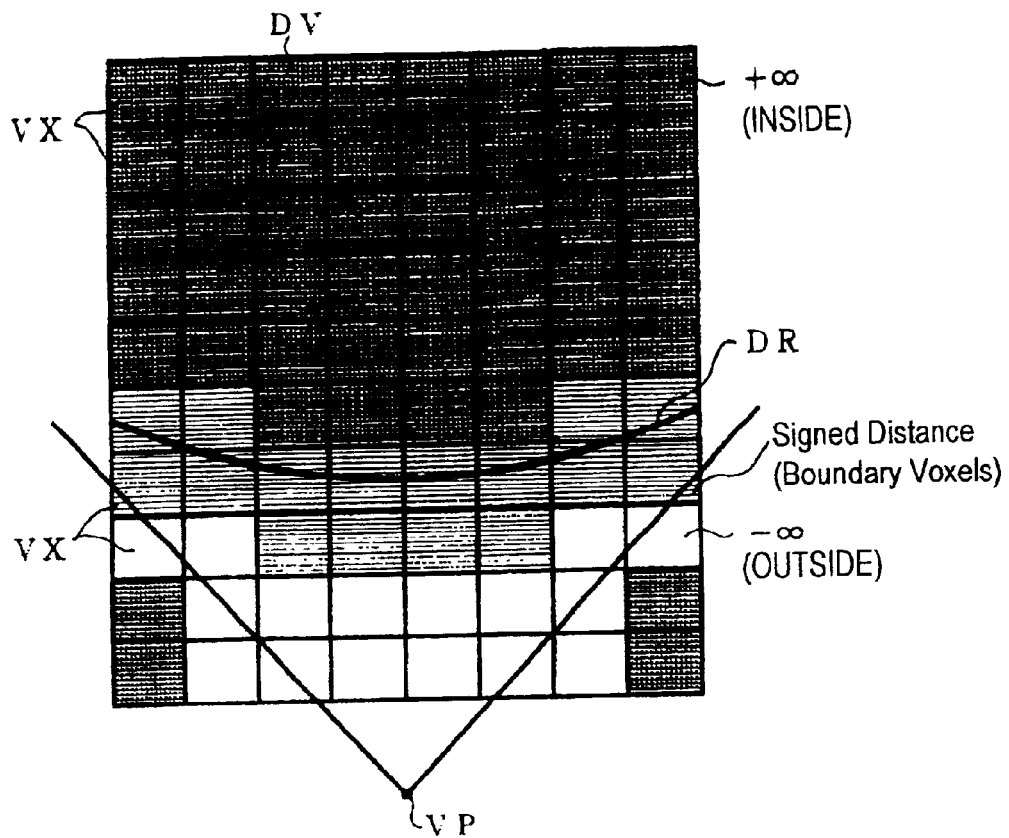
FIG. 20 shows a horizontal cross sectional view of volume data.
Figure 21:
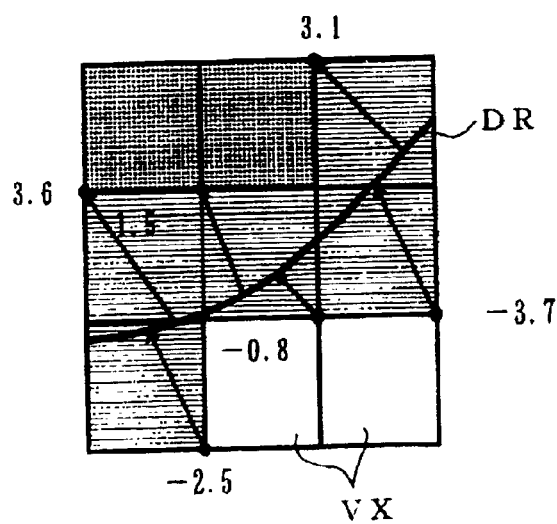
FIG. 21 shows an expanded view of boundary voxels.

FIG. 18 is a flowchart showing a transformation process according to Embodiment 5. FIG. 19 illustrates space carving. FIG. 20 shows a horizontal cross sectional view of volume data DV. FIG. 21 shows an expanded view of boundary voxels. FIGS. 22–25 illustrate a method for obtaining the nearest point MD.

In the present embodiment, transformation process is carried out on a plurality of range data sets DR. Such range data sets are obtained, for example, when an object is measured in several times from diverse positions around the object. Position alignment is assumed to have been carried out already between the range data and the volume data DV.

In FIG. 18, space carving is carried out (#91). The space carving is the process of removing unnecessary portion outside the object from the volume data DV. That is, as shown in FIG. 19, among the voxels VX in the volume data DV, the attribute of each vertex TP of the voxels VX located outside the range data DR is set to be "negative infinity". At that time, a group of lines of sight directing from the point of view VP to the range data DR are assumed. Then, voxels VX which are surrounded by the group of lines of sight and located outside the range data DR are to be removed. Here, similarly to the above-mentioned embodiments, vertices TP in the vicinity of the range data DR are the exception. In FIG. 19, outside voxels VX are shown as white voxels.

A lattice point TPx is targeted (#92). The attribute of the target lattice point TPx is checked (#93). When the attribute is not "negative infinity", the procedure goes to Step #94.

The nearest point MD is obtained for the lattice point TPx (#94). The nearest point MD in the i-th range data DR is designated by ri. The nearest point MD is obtained as follows.

Figure 22:
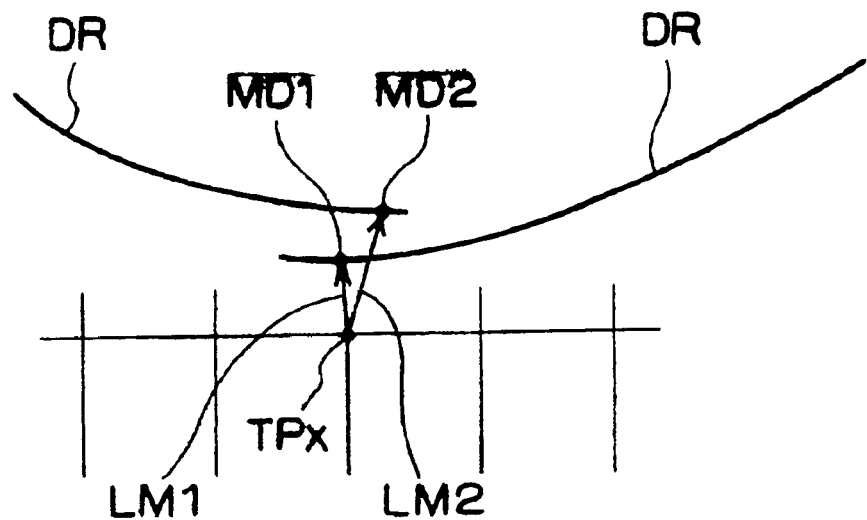
FIGS. 22–25 illustrate a method for obtaining the nearest point.

As shown in FIG. 22, a perpendicular is generated from the lattice point TPx to each of the range data sets DR. When a plurality of perpendiculars can be generated to a range data set DR, the shortest one is selected. The pedestal points are the nearest points MD1 and MD2. Here, the length LM1 and the length LM2 are assumed to be shorter than a predetermined length a. That is, when both the length LM1 and the length LM2 are longer than the predetermined length a, the nearest point MD is assumed not to exist.

When no nearest point MD exists (NO in #95), the attribute of the lattice point TPx is set to be "positive infinity" (#96). When the nearest point or points MD exist (YES in #95), among these nearest points MD, the nearest one to the lattice point TPx is selected as the nearest point rmin (#97).

In the present embodiment, the nearest point MD is selected among three-dimensional polygon data DP constituting the range data DR.

Figure 23:
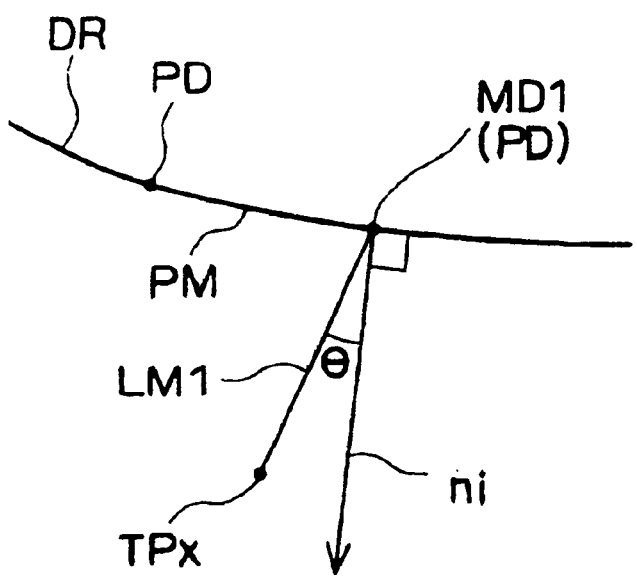
Figure 25:
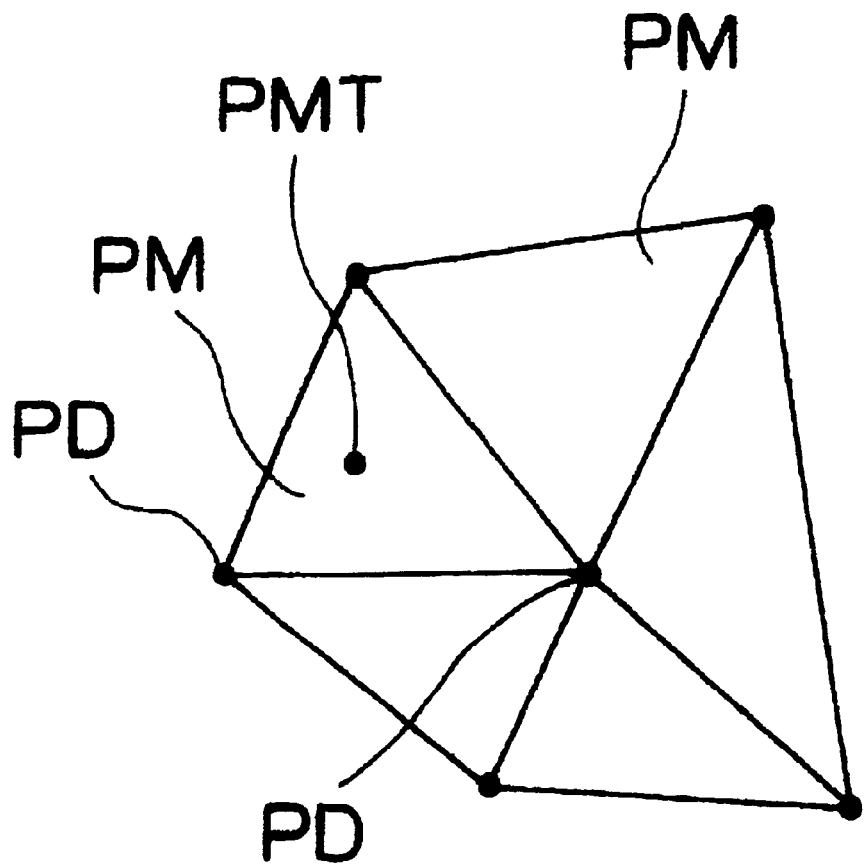

That is, in FIGS. 23 and 25, the nearest point MD1 to the lattice point TPx on the range data DR is identical to a three-dimensional point in the polygon data DP in the range data DR. Thus, the coordinates of the nearest point MD1 are equal to those in polygon data DP. Since all the coordinates in polygon data DP are known in advance, the coordinates of the nearest point MD1 are obtained easily. Nevertheless, the nearest point MD1 is not necessarily the exactly nearest point to the range data DR. Accordingly, in a subsequent process of obtaining the signed distance, the distance is corrected by being multiplied by the cosine of the angle deviating from the normal.

Figure 24:
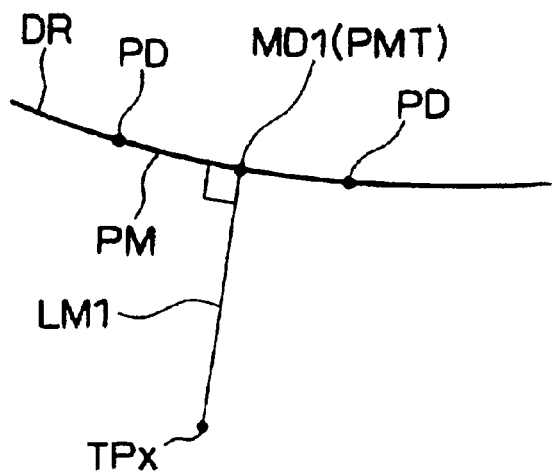

In contrast, when the nearest point MD is set at an arbitrary point PMT on the polygon mesh PM as shown in FIG. 24, the exactly nearest point to the range data DR is obtained. Nevertheless, in this case, the coordinates of the nearest point MD1 are obtained by calculation from the coordinates of the polygon data DP in the vicinity thereof. This causes the necessity of extra time for the calculation of the coordinates.

In FIG. 18, in Step #98, the signed distance from the lattice point TPx to the range data DR is obtained as a weighted mean of the distance from the lattice point TPx to the nearest point or points MD. The signed distance is obtained as follows.

Among the nearest points MD, extracted are those located within a predetermined distance from the nearest point rmin. The nearest point rmin also is included in the group of the extracted points. In other words, the nearest points MD located outside the predetermined distance from the nearest point rmin are excluded. Then, obtained is the distance from the lattice point TPx to each of the extracted nearest points MD. The final result is obtained as a weighted mean of all of the obtained distance values.

That is, the signed distance dr(x) for the lattice point TPx is obtained by $$dr(x) = \Sigma Wi \cdot [ni \cdot (ri - TPx)] / \Sigma Wi \qquad (1)$$

where ri indicates the nearest point in the i-th range data, ni indicates the normal vector at the nearest point ri, wi indicates the weight for the nearest point ri, and $$Wi = \left| \frac{ni \cdot (ri - TPx)}{|ri - TPx|} \right| \qquad (2)$$

As such, the distance between the lattice point TPx and the nearest point ri is obtained as the product between: the length of the line segment joining the lattice point TPx and the nearest point ri (that is, the distance therebetween); and the cosine of the angle deviating from the normal to the line segment at the nearest point ri. This equals to the distance from the nearest point MD to the lattice point TPx in the normal direction. The distance is defined as negative in the normal vector direction. These obtained distance values are averaged out with a weight corresponding to the reliability of each nearest point ri. As such, the signed distance is obtained.

The weight wi is the cosine of the angle between the normal vector ni at the nearest point ri and a vector directing from the lattice point TPx to the nearest point ri. In other words, a larger angle indicates a lower reliability, and hence has a smaller weight wi.

The signed distance obtained here is stored as the attribute of the lattice point TPx.

It is checked whether all the lattice points TP have been processed (#99). When there remains a lattice point TP to be processed, Step #92 and the subsequent steps are repeated. When all the lattice points TP have been processed, the procedure is terminated. As a result, a volume table TLr corresponding to the range data DR is obtained similarly to volume table TLs shown in FIG. 11.

<<Integration of Volume Data>>

In Steps #2 and #3 of FIG. 2, volume data DV based on the silhouette images FS and volume data DV based on the range data DR have been generated. In Step #4, these volume data sets DV are integrated. In the integration of the volume data sets DV, the attribute of an integrated voxel VX is obtained from the attribute values of the two voxels VX corresponding to each other in the volume data sets DV. The attribute in the volume data DV based on the silhouette images FS is referred to as the silhouette attribute ds in some cases. The attribute in the volume data DV based on the range data DR is referred to as the range attribute dr. The attribute in the integrated volume data DV is referred to as the integrated attribute dt.

Figures 26, 27:
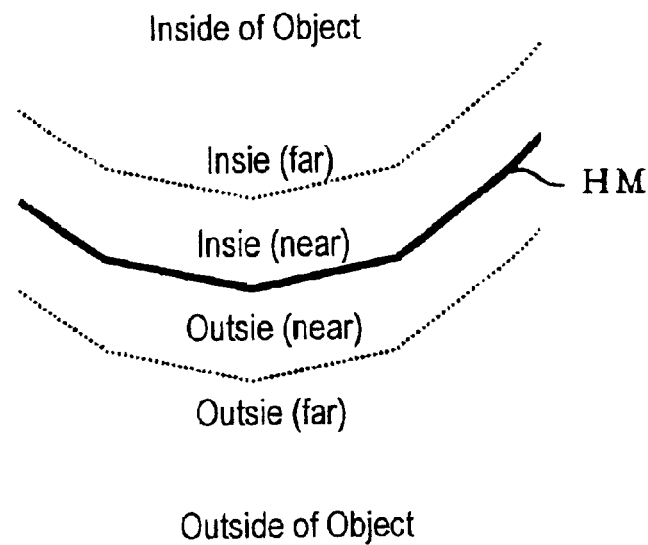
FIG. 26 illustrates the positional relation to the object surface depending on the attribute of lattice points.
FIG. 27 illustrates a method for integrating two attribute values.

FIG. 26 illustrates the positional relation to the object surface depending on the attribute of lattice points. FIG. 27 illustrates a method for integrating two attribute values.

As shown in FIG. 26, the attribute relative to the object surface HM is classified into four categories: outside (far), outside (near), inside (near), and inside (far).

That is, the attribute "negative infinity" corresponds to the category "outside (far)". The attribute "positive infinity" corresponds to the category "inside (far)". A negative attribute other than "negative infinity" corresponds to the category "outside (near)". A positive attribute other than "positive infinity" corresponds to the category "inside (near)". These rules are applicable commonly to the volume data sets DV based on the silhouette images FS and the range data DR.

As shown in FIG. 27, when the silhouette attribute ds is "outside (far)", the integrated attribute dt is "negative infinity" indicating "outside (far)", regardless of the range attribute dr. When the silhouette attribute ds and the range attribute dr are both "inside (far)", the integrated attribute dt is "positive infinity" indicating "inside (far)". Although the following situation is not actual, when the silhouette attribute ds is "inside (far)", and when the range attribute dr is "outside (far)", the integrated attribute dt is "negative infinity" indicating "outside (far)".

In other cases, when one attribute is "outside (far)" or "inside (far)", and when the other attribute is "outside (near)" or "inside (near)", the attribute "outside (near)" or "inside (near)" is assigned. When each attribute is "outside (near)" or "inside (near)", both attribute values are mixed. The mixing in the integrated attribute dt is obtained by the following Formula (3).

$$dt = wx \times dr + (1 - wx) ds \qquad (3)$$

Here, wx indicates the weight for the range attribute dr at a lattice point TPx. That is, the range attribute dr and the silhouette attribute ds are mixed in the ratio proportional to the weight wx for the range attribute dr. The value of the weight wx is determined on the basis of the shape of the object and the like. By virtue of this addition operation in an appropriate ratio corresponding to the weight, the volume data DV based on the silhouette images FS and the volume data DV based on the range data DR are interconnected smoothly at the boundary. The integrated attribute dt obtained here is stored as the attribute of the lattice point TP. As such, an attribute value is obtained for each lattice point TP. Thus, the integration process has been completed.

As such, the volume data DV based on the silhouette images FS and the volume data DV based on the range data DR are integrated, whereby disadvantages in each volume data set DV are compensated. Accordingly, a precise three-dimensional model ML without deficit is obtained.

Thus, the three-dimensional shape is precisely reproduced using a small amount of memory capacity and a small amount of operation time even in case of an object having recesses and low reflectivity portions.

In the above-mentioned embodiments, an attribute has been assigned to each vertex of the voxel. However, the invention is not restricted to this. An attribute may be assigned to the barycenter of the voxel.

Further, the distance value between a vertex and the boundary has been set only for voxels intersected by the boundary. Such a distance value may be set to every voxel. However, the former approach reduces the time necessary for the calculation. Further, the inside of the object has been defined as positive, while the outside of the object has been defined as negative. However, the definition may be reversed.

In Embodiment 4, the cube has been divided into eight. However, the cube may be divided into three (or n) in each of the x-, y-, and z-directions. That is, the cube may be divided into 27 (or $n^3$).

In the above-mentioned embodiments, the configuration of the entirety or a part of the three-dimensional data generating apparatus 1, the contents and the order of the processes, the number of voxels VX, and the number of bits used for the attribute can be modified without departing from the spirit of the invention.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method for generating three-dimensional shape data of an object, said method comprising:
    (a) transforming a plurality of images of said object viewed from diverse points of view into volume data by shape-from-silhouette method, and thereby generating first volume data;
    (b) transforming three-dimensional data obtained by a three-dimensional measurement of said object into volume data, and thereby generating second volume data; and
    (c) integrating said first volume data and said second volume data into integrated volume data.

2. The method as claimed in claim 1, wherein the step (a) comprises:
    (a1) in each of discrete coordinate positions within a coordinate system for rendering a volume, obtaining a value corresponding to the distance to the boundary of a viewed volume defined by the contour of the image of said object and by the point of view of said image; and
    (a2) in each of said coordinate positions, on the basis of a plurality of said values corresponding to the distance to the boundary of a viewed volume obtained for said images of said object, determining a value corresponding to the distance to the object surface and then maintaining said value corresponding to the distance to the object surface in a manner corresponded to said coordinate position.

3. The method as claimed in claim 1, wherein the step (b) comprises:
    (b1) in each of discrete coordinate positions within a coordinate system for rendering a volume, obtaining a value corresponding to the distance to the object surface represented by said three-dimensional data of said object; and
    (b2) maintaining said value in a manner corresponded to said coordinate position.

4. The method as claimed in claim 1, wherein, in the step (c), the first volume data and the second volume data are added with a predetermined proportion.

5. An apparatus for generating three-dimensional data of an object, said apparatus comprising:
    a first section for transforming a plurality of images of said object viewed from diverse points of view into volume data by shape-from-silhouette method, and thereby generating first volume data;
    a second section for transforming three-dimensional data obtained by a three-dimensional measurement of said object into volume data, and thereby generating second volume data; and
    a third section for integrating said first volume data and said second volume data into integrated volume data.

6. A computer, controlled method for generating three-dimensional data of an object, said computer controlled method executing the steps of:
    (a) transforming a plurality of images of said object viewed from diverse points of view into volume data by shape-from-silhouette method, and thereby generating first volume data;
    (b) transforming three-dimensional data obtained by a three-dimensional measurement of said object into volume data, and thereby generating second volume data; and
    (c) integrating said first volume data and said second volume data into integrated volume data.

7. A computer program product comprising a computer usable medium having encoded thereon a computer readable program for generating three-dimensional data of an object by performing the operations of:
    (a) transforming a plurality of images of said object viewed from diverse points of view into volume data by shape-from-silhouette method, and thereby generating first volume data;
    (b) transforming three-dimensional data obtained by a three-dimensional measurement of said object into volume data, and thereby generating second volume data; and
    (c) integrating said first volume data and said second volume data into integrated volume data.

* * * * *